US012786565B2

(12) United States Patent
Kanda et al.

(10) Patent No.: US 12,786,565 B2
(45) Date of Patent: Nov. 3, 2026

(54) IMAGE PROCESSING APPARATUS, IMAGE PROCESSING METHOD, AND IMAGE CAPTURE APPARATUS

(71) Applicant: CANON KABUSHIKI KAISHA, Tokyo (JP)

(72) Inventors: Akihiko Kanda, Kanagawa (JP); Hiroshi Yashima, Kanagawa (JP); Hideki Ogura, Kanagawa (JP); Hideyuki Hamano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 70 days.

(21) Appl. No.: 18/978,651

(22) Filed: Dec. 12, 2024

(65) Prior Publication Data

US 2025/0227367 A1 Jul. 10, 2025

Related U.S. Application Data

(63) Continuation of application No. 18/067,034, filed on Dec. 16, 2022, now Pat. No. 12,289,521.

(30) Foreign Application Priority Data

Dec. 24, 2021 (JP) ................................ 2021-211449

(51) Int. Cl.
*H04N 23/67* (2023.01)
*G06T 7/70* (2017.01)
(Continued)

(52) U.S. Cl.
CPC ............ *H04N 23/675* (2023.01); *G06T 7/70* (2017.01); *G06V 10/761* (2022.01);
(Continued)

(58) Field of Classification Search
CPC .... H04N 23/675; H04N 23/672; H04N 23/61; H04N 23/611; G06T 7/70;
(Continued)

(56) References Cited

U.S. PATENT DOCUMENTS 11,006,033 B2 * 5/2021 Miao .................... H04N 23/675
11,394,869 B2 * 7/2022 Fukugawa ........... G06V 10/764
(Continued)

FOREIGN PATENT DOCUMENTS

JP 2012134688 A 7/2012
JP 2018-066889 A 4/2018

OTHER PUBLICATIONS

Zhe Cao, et al., "Realtime multi-person 2D pose estimation using part affinity fields", Proceedings of the IEEE Conference on Computer Vision and Pattern Recognition, 2017, Cited in Specification in paragraph [0056].

*Primary Examiner* — Ahmed A Berhan

(57) ABSTRACT

An image processing apparatus detects, from an image, a subject(s) of a first type and a subject(s) of a second type. The apparatus further detects a posture for each of the subject(s) of the first type. The apparatus then obtains, for each of the subject(s) of the first type, reliability that the subject is a main subject, based on the posture, and obtains a focus condition for each of the subject(s) of the first type and each of the subject(s) of the second type. The apparatus determines, based on the reliability and the focus condition, a main subject from the subject(s) of the first type and the subject(s) of the second type detected from the image.

29 Claims, 16 Drawing Sheets

(51) Int. Cl.
*G06V 10/74* (2022.01)
*G06V 20/60* (2022.01)
*H04N 23/61* (2023.01)

(52) U.S. Cl.
CPC ............... *G06T 2207/20044* (2013.01); *G06T 2207/30196* (2013.01); *G06V 2201/07* (2022.01)

(58) Field of Classification Search
CPC ........... G06T 2207/20044; G06T 2207/30196; G06V 10/761; G06V 2201/07; G06V 10/764; G06V 10/82; G06V 20/52; G06V 20/60; G06V 40/103
See application file for complete search history.

(56) References Cited

U.S. PATENT DOCUMENTS

| | | | | |
|---|---|---|---|---|
| 11,992,765 | B2 * | 5/2024 | Ikeda | A63F 13/42 |
| 12,567,154 | B2 * | 3/2026 | Komiya | G03B 3/10 |
| 2021/0127068 | A1 * | 4/2021 | Nishiyama | G06V 40/20 |

* cited by examiner

PLAN VIEW a-a CROSS-SECTIONAL VIEW

IMAGE PROCESSING APPARATUS, IMAGE PROCESSING METHOD, AND IMAGE CAPTURE APPARATUS

CROSS-REFERENCE TO RELATED APPLICATION

This application is a continuation of application Ser. No. 18/067,034, filed Dec. 16, 2022, the entire disclosure of which is hereby incorporated by reference.

BACKGROUND OF THE INVENTION

Field of the Invention

The present invention relates to an image processing apparatus, an image processing method, and an image capture apparatus, and particularly relates to a technique for determining a main subject from an image.

Description of the Related Art

Japanese Patent Laid-Open No. 2018-66889 describes a technique for determining from among target subjects such as the faces of people, a subject closest to a tracking target subject as a main subject.

In a case where a main subject is determined as described in Japanese Patent Laid-Open No. 2018-66889, the distance from the image capture apparatus to the main subject can change drastically when the main subject changes. Frequent changes of the main subject may cause a period where no subject is in focus to be longer and thus the quality of the captured moving image to be degraded.

SUMMARY OF THE INVENTION

One aspect of the present invention provides an image processing apparatus, an image processing method, and an image capture apparatus capable of suppressing a drop in the quality of a moving image caused by a main subject changing.

According to an aspect of the present invention, there is provided an image processing apparatus comprising: one or more processors which, when executing a program stored in a memory, function as: a first detection unit configured to detect, from an image, a subject(s) of a first type and a subject(s) of a second type that is a different type from the subject(s) of the first type; a second detection unit configured to detect a posture for each of the subject(s) of the first type detected by the first detection unit; a first obtainment unit configured to obtain, for each of the subject(s) of the first type detected by the first detection unit, reliability that the subject is a main subject, based on the posture; a second obtainment unit configured to obtain a focus condition for each of the subject(s) of the first type and each of the subject(s) of the second type detected by the first detection unit; and a determination unit configured to determine, based on the reliability and the focus condition, a main subject from the subject(s) of the first type and the subject(s) of the second type detected by the first detection unit.

According to another aspect of the present invention, there is provided an image capture apparatus comprising: an image sensor that captures an image; an image processing apparatus that determines a main subject in the image captured by the image sensor; and a control circuit that focuses an image capturing optical system on the main subject determined by the image processing apparatus, wherein the image processing apparatus comprises: one or more processors which, when executing a program stored in a memory, function as: a first detection unit configured to detect, from an image, a subject(s) of a first type and a subject(s) of a second type that is a different type from the subject(s) of the first type; a second detection unit configured to detect a posture for each of the subject(s) of the first type detected by the first detection unit; a first obtainment unit configured to obtain, for each of the subject(s) of the first type detected by the first detection unit, reliability that the subject is a main subject, based on the posture; a second obtainment unit configured to obtain a focus condition for each of the subject(s) of the first type and each of the subject(s) of the second type detected by the first detection unit; and a determination unit configured to determine, based on the reliability and the focus condition, a main subject from the subject(s) of the first type and the subject(s) of the second type detected by the first detection unit.

According to a further aspect of the present invention, there is provided an image processing method executed by an image processing apparatus, the image processing method comprising: detecting, from an image, a subject(s) of a first type and a subject(s) of a second type that is a different type from the subject(s) of the first type; detecting a posture for each of the detected subject(s) of the first type; obtaining, for each of the detected subject(s) of the first type, reliability that the subject is a main subject, based on the posture; obtaining a focus condition for each of the detected subject(s) of the first type and each of the detected subject(s) of the second type; and determining, based on the reliability and the focus condition, a main subject from the subject(s) of the first type and the subject(s) of the second type detected by the first detection unit.

According to another aspect of the present invention, there is provided a non-transitory computer-readable medium storing a program for causing a computer to function as an image processing apparatus comprising: a first detection unit configured to detect, from an image, a subject (s) of a first type and a subject(s) of a second type that is a different type from the subject(s) of the first type; a second detection unit configured to detect a posture for each of the subject(s) of the first type detected by the first detection unit; a first obtainment unit configured to obtain, for each of the subject(s) of the first type detected by the first detection unit, reliability that the subject is a main subject, based on the posture; a second obtainment unit configured to obtain a focus condition for each of the subject(s) of the first type and each of the subject(s) of the second type detected by the first detection unit; and a determination unit configured to determine, based on the reliability and the focus condition, a main subject from the subject(s) of the first type and the subject(s) of the second type detected by the first detection unit.

Further features of the present invention will become apparent from the following description of exemplary embodiments (with reference to the attached drawings).

DESCRIPTION OF THE EMBODIMENTS

Figure 1:
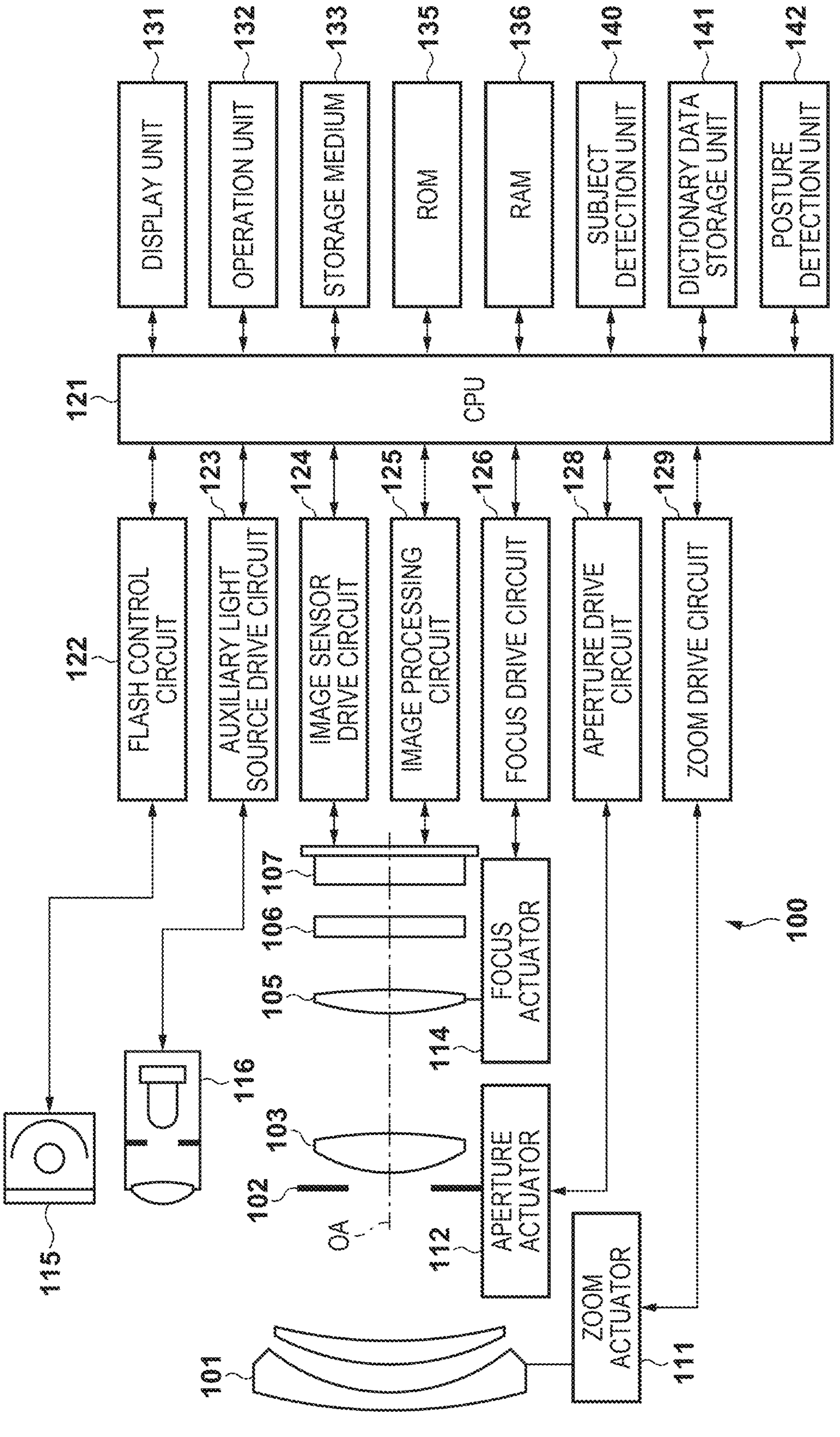
FIG. 1 is a block diagram illustrating an example of the functional configuration of a digital camera serving as an example of an image processing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Note that the following embodiments will describe a case where the present invention is applied in an image capture apparatus such as a digital camera. However, an image capture function is not essential to the present invention, and the present invention can be implemented in any electronic device. Examples of such an electronic device include computer devices (personal computers, tablet computers, media players, PDAs, and the like), mobile phones, smartphones, game consoles, robots, drones, and dashboard cameras. These are merely examples, however, and the present invention can be applied in other electronic devices as well.

Overall Configuration

FIG. 1 is a block diagram illustrating an example of the functional configuration of a digital camera 100 serving as an example of an image processing apparatus according to the present embodiment. The digital camera 100 (called simply a "camera 100" hereinafter) has an image capturing optical system which includes a first lens group 101, an aperture stop 102, a second lens group 103, and a third lens group 105, and which forms an optical image of a subject on an image capturing plane of an image sensor 107.

The first lens group 101 is located closest to the front (the subject side) of the plurality of lens groups included in the image capturing optical system, and can move along an optical axis OA. The position of the first lens group 101 is controlled by a zoom actuator 111. The zoom actuator 111 moves the first lens group 101 and the second lens group 103 in tandem in the optical axis direction by driving a cam cylinder (not shown), for example.

The aperture stop 102 has an aperture amount which can be adjusted by an aperture actuator 112, and functions as a mechanical shutter when capturing still images. Note that a mechanical shutter separate from the aperture stop 102 and a shutter actuator that drives the mechanical shutter may be provided.

The second lens group 103 moves integrally with the aperture stop 102, as well as in tandem with the first lens group 101 along the optical axis OA. The angle of view of the image capturing optical system (the focal length) is determined according to the positions of the first lens group 101 and the second lens group 103.

The third lens group 105 is capable of moving along the optical axis OA. The position of the third lens group 105 is controlled by a focus actuator 114. The focal length of the image capturing optical system is determined by the position of the third lens group. The third lens group is called a focus lens.

An optical low-pass filter 106 is provided to reduce false colors, moiré, and the like in captured images.

The image sensor 107 is, for example, a CMOS image sensor or CCD sensor image sensor having a rectangular pixel array (also called a "pixel region") constituted by m pixels in the horizontal direction and n pixels in the vertical direction, arranged two-dimensionally. Each pixel is provided with a color filter based on the primary color Bayer array and an on-chip microlens, for example. Note that the image sensor 107 may be a three-plate color image sensor.

Note that in the present embodiment, the image capturing optical system, the zoom actuator 111, the aperture actuator 112, the focus actuator 114, a focus drive circuit 126, an aperture drive circuit 128, and a zoom drive circuit 129 are provided in the camera 100. However, these constituent elements may be provided in a lens unit which can be attached to and removed from the camera 100.

A flash 115 is a light source that illuminates the subject. The flash 115 includes a flash emission device that uses a xenon tube, or an LED (light-emitting diode) that emits continuous light. An autofocus (AF) auxiliary light source 116 projects a predetermined pattern image through a projection lens. This improves the focus detection performance for low-luminance or low-contrast subjects.

A CPU 121 controls the operations of the image capture apparatus 100 as a whole. The CPU 121 includes an A/D converter, a D/A converter, a communication interface circuit, and the like. By loading a program stored in ROM 135 into RAM 136 and executing the program, the CPU 121 controls each part of the image capture apparatus 100 and realizes the functions of the image capture apparatus 100, such as automatic focus detection (AF), image capturing, image processing, recording, and the like. Some of the functions realized by the CPU 121 by executing programs may be implemented by hardware circuits separate from the CPU 121. Reconfigurable circuits such as FPGAs may be used for some of the circuits as well. For example, some calculations may be performed by a dedicated hardware circuit to reduce the time required for the calculations for focus detection (described later).

The communication interface circuit included in the CPU 121 supports one or more standards for wired and wireless communication. The image capture apparatus 100 can communicate with external devices directly or via other devices through the communication interface circuit.

A flash control circuit 122 controls the lighting of the flash 115 in synchronization with image capture operations. An auxiliary light source drive circuit 123 controls the lighting of the AF auxiliary light source 116 in synchronization with focus detection processing. An image sensor drive circuit 124 controls the image capture operations by the image sensor 107, as well as performing A/D conversion on signals obtained from the image capture operations and transmitting those image signals to the CPU 121. An image processing circuit 125 can apply various types of image processing to image data, such as gamma conversion, color interpolation, encoding, decoding, evaluation value generation, detection of feature regions, and the like.

The focus drive circuit 126 drives the focus actuator 114 based on commands, which include drive amounts and drive directions of the focus lens, supplied from the CPU 121. As a result, the third lens group 105 moves along the optical axis OA, and the focal length of the image capturing optical system changes.

The aperture drive circuit 128 controls the diameter, and the opening and closing, of the aperture stop 102 by driving the aperture actuator 112. The zoom drive circuit 129 changes the focal length (angle of view) of the image capturing optical system by, for example, driving the zoom actuator 111 in response to a user instruction and moving the first lens group 101 and the second lens group 103 along the optical axis OA.

A display unit 131 includes, for example, an LCD (liquid crystal display device). The display unit 131 displays information pertaining to the image capture mode of the image capture apparatus 100, a preview image before an image is captured, a confirmation image after an image is captured, a focus state display image during focus detection, and the like. An operation unit 132 includes a power switch, a release switch, a zoom operation switch, an image capture mode selection switch, and the like. The release switch includes two switches, namely SW1, which turns on when depressed halfway, and SW2, which turns on when fully depressed. A recording medium 133 is, for example, a semiconductor memory card that can be attached to and removed from the image capture apparatus 100, and still image data and moving image data obtained from capturing are recorded into the recording medium 133.

Note that if the display unit 131 is a touch screen, a touch panel, a combination of a touch panel and a GUI displayed in the display unit 131, or the like may be used as the operation unit 132. For example, the configuration can be such that when a tap operation on the touch panel is detected during a live view display, focus detection is performed using an image region corresponding to the tapped position as the focus detection region.

Note that contrast information of captured image data can also be calculated by the image processing circuit 125, with the CPU 121 executing contrast AF. In contrast AF, the contrast information is calculated sequentially while moving the focus lens group 105 and changing the focal length of the image capturing optical system, and the focus lens position where the contrast information peaks is set as the in-focus position.

In this manner, the image capture apparatus 100 can perform both image plane-based phase-detection AF and contrast AF, and one of these can be used selectively, or both in combination, according to the situation.

A subject detection unit 140 can be configured using a convolutional neural network (CNN), for example. By configuring a CNN using parameters generated through machine learning for each of subject types (dictionary data), a region of a specific subject present within an image expressed by image data can be detected. The subject detection unit 140 may be implemented using dedicated hardware configured to be capable of executing operations of processing using a CNN at high speeds, such as a graphics processing unit (GPU), a neural processing unit (NPU), or the like.

The machine learning for generating the dictionary data can be implemented using any publicly-known method, such as supervised learning or the like. Specifically, the CNN can be trained using a data set that associates input images with whether a target subject is present in the image, for each of subject types. The trained CNN or the parameters thereof can be stored in a dictionary data storage unit 141 as the dictionary data. Note that the training of the CNN may be performed by a device different from the camera 100. When a trained CNN is to be used for subject detection processing on a captured image, an image of the same size as the input images used when training the CNN is cut out from the captured image and input to the CNN. The region where a target subject appearance can be estimated by inputting the cutout position to the CNN while sequentially changing that cutout position.

Note that the subject region may be detected using another method, such as detecting an object region in the image and then using feature quantities for each type of subject to determine which type of subject the object region is. The configuration of the neural network, the learning method, and the like can be changed according to the detection method which is used.

The subject detection unit 140 can be implemented through any publicly-known method as long as the number, position, size, and reliability of a region estimated to contain a pre-set type of subject can be output with respect to an input image.

By repeatedly applying subject detection processing while switching the dictionary data, the subject detection unit 140 can apply subject detection processing for a plurality of types of subjects to one frame's worth of image data. The CPU 121 can determine the dictionary data to be used in the subject detection processing from among a plurality of instances of dictionary data stored in the dictionary data storage unit 141, based on priority levels set in advance for the subject types, setting values of the camera 100, and the like.

The type of the subject may be, for example, a human body, organs of the human body (the face, the pupils, the torso, or the like), or subjects aside from humans (animals, inanimate objects (tools, vehicles, buildings, and the like)), and so on, but is not limited thereto. Separate dictionary data is prepared for subjects having different features. Here, it is assumed that objects which move among competitors in sports (among subjects of a first type), such as balls, pucks, shuttles, or the like, are detected as the subjects aside from humans.

Dictionary data for detecting a human body may be prepared separately as dictionary data for detecting the human body (contours) and dictionary data for detecting the organs of the human body. The dictionary data for detecting the organs of the human body may be prepared individually for each type of organ.

A posture obtaining unit 142 estimates the posture of the subject for each subject region detected by the subject detection unit 140. What information should be obtained by the posture obtaining unit 142 with respect to the posture of the subject is assumed to be set in advance according to the subject type. For example, when the subject is a human, the posture obtaining unit 142 is assumed to obtain the positions of a plurality of joints as the information pertaining to the posture of the subject.

Note that the method for estimating the posture of the subject from the image of the subject region may be any publicly-known method. For example, the method described in "Cao, Zhe, et al., 'Realtime multi-person 2d pose estimation using part affinity fields.', Proceedings of the IEEE Conference on Computer Vision and Pattern Recognition, 2017" may be used.

Image Sensor

The pixel array and pixel structure of the image sensor 107 will be described with reference to FIGS. 2 to 3B. The left-right direction in FIG. 2 corresponds to an x direction (a horizontal direction); the up-down direction, to a y direction (a vertical direction); and a direction orthogonal to the x and y directions (perpendicular to the paper), to a z direction (an optical axis direction). The example illustrated in FIG. 2 illustrates the pixel (unit pixel) array of the image sensor 107 in a range of four columns by four rows, and a sub-pixel array in a range of eight columns by four rows.

A two-column by two-row pixel group 200, for example, has a pixel 200R having spectral sensitivity to a first color R (red) in an upper-left position, a pixel 200G having spectral sensitivity to a second color G (green) in upper-right and lower-left positions, and a pixel 200B having spectral sensitivity to a third color B (blue) in a lower-right position. Furthermore, each pixel (unit pixel) is divided into two parts in the x direction (Nx divisions) and one part in the y direction (Ny divisions) (a division number $N_{LF}$=Nx×Ny), and is therefore constituted by a plurality of sub-pixels, namely a first sub-pixel 201 and a second sub-pixel 202 (from a first sub-pixel to an $N_{LF}$-th sub-pixel).

Figure 2:
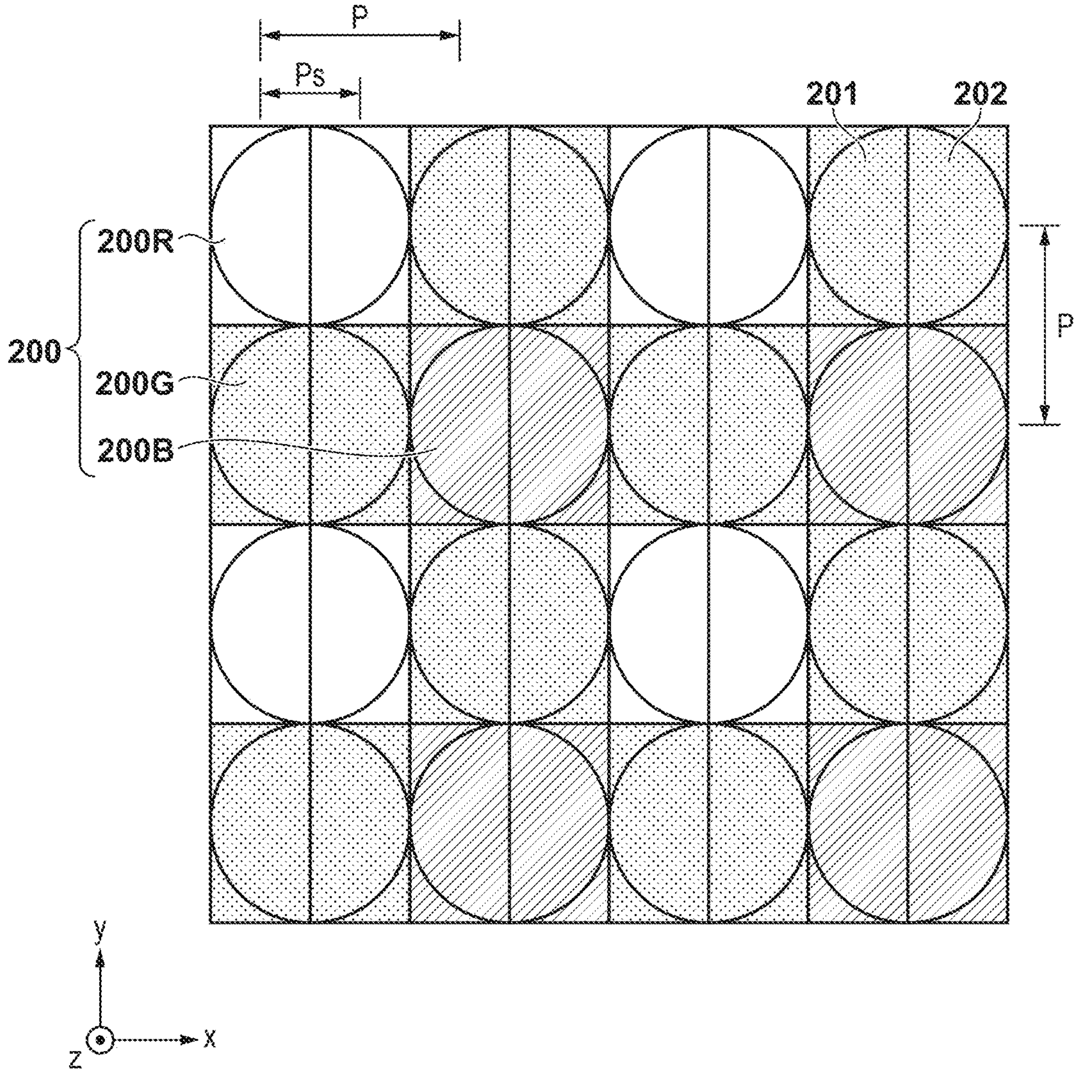
FIG. 2 is a diagram schematically illustrating a pixel array according to an embodiment.

In the example illustrated in FIG. 2, by dividing each pixel of the image sensor 107 into two sub-pixels aligned in the horizontal direction, it is possible to generate a number of viewpoint images equal to the division number $N_{LF}$ and a captured image that is a composite of all the viewpoint images from an image signal obtained from a single capture. Note that the pixels may be divided in two directions, and the number of divisions per direction is not limited. As such, it can be said that the viewpoint images are images generated from the signals of some of the plurality of sub-pixels, and the captured image is an image generated from the signals of all the sub-pixels. In the present embodiment, as an example, a pixel period P of the image sensor 107 in the horizontal and vertical directions is 6 μm, a horizontal pixel number $N_H$=6000, and a vertical pixel number $N_V$=4000. A total pixel number N is therefore $N_H \times N_V$=24 million. If a horizontal period $P_S$ of the sub-pixels is 3 μm, a total sub-pixel number $N_S = N_H \times (P/P_S) \times N_V$=48 million.

Figure 3A:
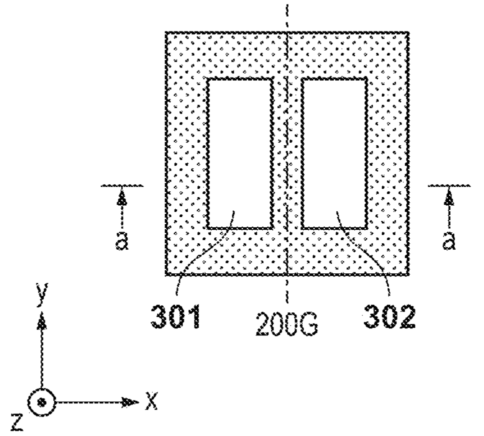
FIGS. 3A and 3B are a schematic plan view and a schematic cross-sectional view of a pixel according to an embodiment.

FIG. 3A is a plan view of one pixel 200G of the image sensor 107 illustrated in FIG. 2, viewed from a light receiving surface-side (+z side) of the image sensor 107. The z axis is set in the direction perpendicular to the paper surface in FIG. 3A, and the front side is defined as the positive direction in the z axis. Additionally, the y axis is set in the up-down direction orthogonal to the z axis, and "upward" is defined as the positive direction in the y axis; and the x axis is set in the left-right direction orthogonal to the z axis and y axis, and "rightward" is defined as the positive direction of the x axis. FIG. 3B is a cross-sectional view taken from the −y side along an a-a cut line in FIG. 3A.

Figure 3B:
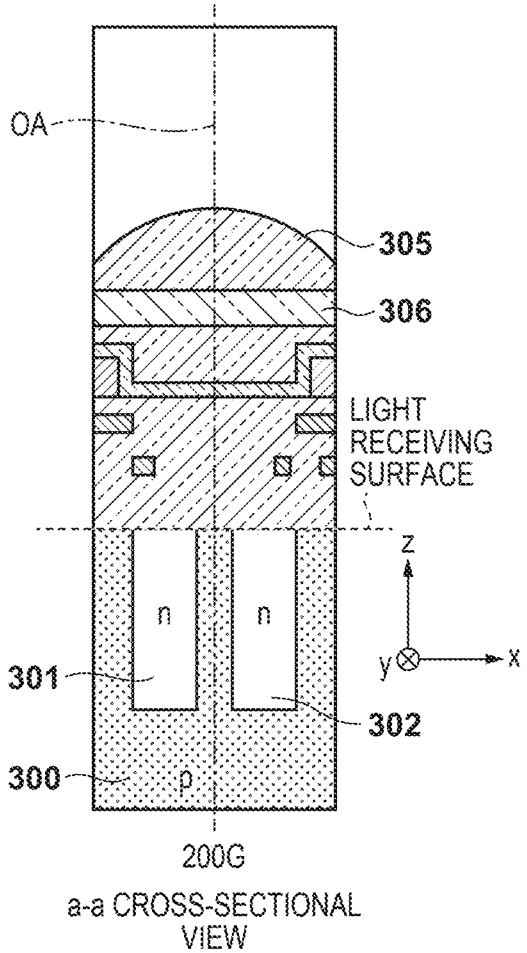

As illustrated in FIGS. 3A and 3B, microlenses 305 are formed on the light receiving surface-side (the +z direction) of each pixel 200G, and incident light is focused by the microlenses 305. Furthermore, a plurality of photoelectric conversion units having two divisions are formed, with two divisions in the x (horizontal) direction and one division in the y (vertical) direction, for a first photoelectric conversion unit 301 and a second photoelectric conversion unit 302. The first photoelectric conversion unit 301 and the second photoelectric conversion unit 302 correspond to the first sub-pixel 201 and the second sub-pixel 202, respectively, in FIG. 2. Described more generally, when the photoelectric conversion unit of each pixel is divided into Nx divisions in the x direction and Ny divisions in the y direction, and the division number $N_{LF}$ of the photoelectric conversion unit is $N_{LF}$=Nx×Ny, first to $N_{LF}$-th photoelectric conversion units correspond to the first to $N_{LF}$-th sub-pixels.

The first photoelectric conversion unit 301 and the second photoelectric conversion unit 302 are two independent pn junction photodiodes, constituted by a p-type well layer 300 and two divided n-type layers 301 and 302. If necessary, the units may surround an intrinsic layer and be formed as a pin structure photodiode. In each pixel, a color filter 306 is formed between the microlens 305, and the first photoelectric conversion unit 301 and second photoelectric conversion unit 302. If necessary, the spectral transmittance of the color filter 306 may be changed for each pixel or each photoelectric conversion unit, or the color filter may be omitted.

The light incident on the pixel 200G is focused by the microlens 305, further spectrally divided by the color filter 306, and then received by the first photoelectric conversion unit 301 and the second photoelectric conversion unit 302, respectively. In the first photoelectric conversion unit 301 and the second photoelectric conversion unit 302, electrons and holes are produced in pairs according to the amount of light received, and electrons are stored after being separated by a barrier layer. On the other hand, the holes are discharged to the exterior of the image sensor 107 through a p-type well layer connected to a constant voltage source (not shown). The electrons accumulated in the first photoelectric conversion unit 301 and the second photoelectric conversion unit 302 are transferred to an electrostatic capacitance unit (FD) via a transfer gate and converted into voltage signals.

Note that in the present embodiment, the microlenses 305 correspond to an optical system in the image sensor 107. The optical system in the image sensor 107 may be configured to use microlenses as in the present embodiment, or may be configured to use a material having a different refractive index, such as a waveguide or the like. Additionally, the image sensor 107 may be a backside-illuminated image sensor having circuits and the like on the surface opposite the surface having the microlenses 305, or may be a stacked image sensor including some circuits such as the image sensor drive circuit 124, the image processing circuit 125, and the like. Materials other than silicon may be used as the semiconductor substrate, and for example, an organic material may be used as the photoelectric conversion material.

Pupil Division

A pupil division function of the image sensor 107 according to the present embodiment will be described next with reference to FIGS. 4 and 5A.

Figure 4:
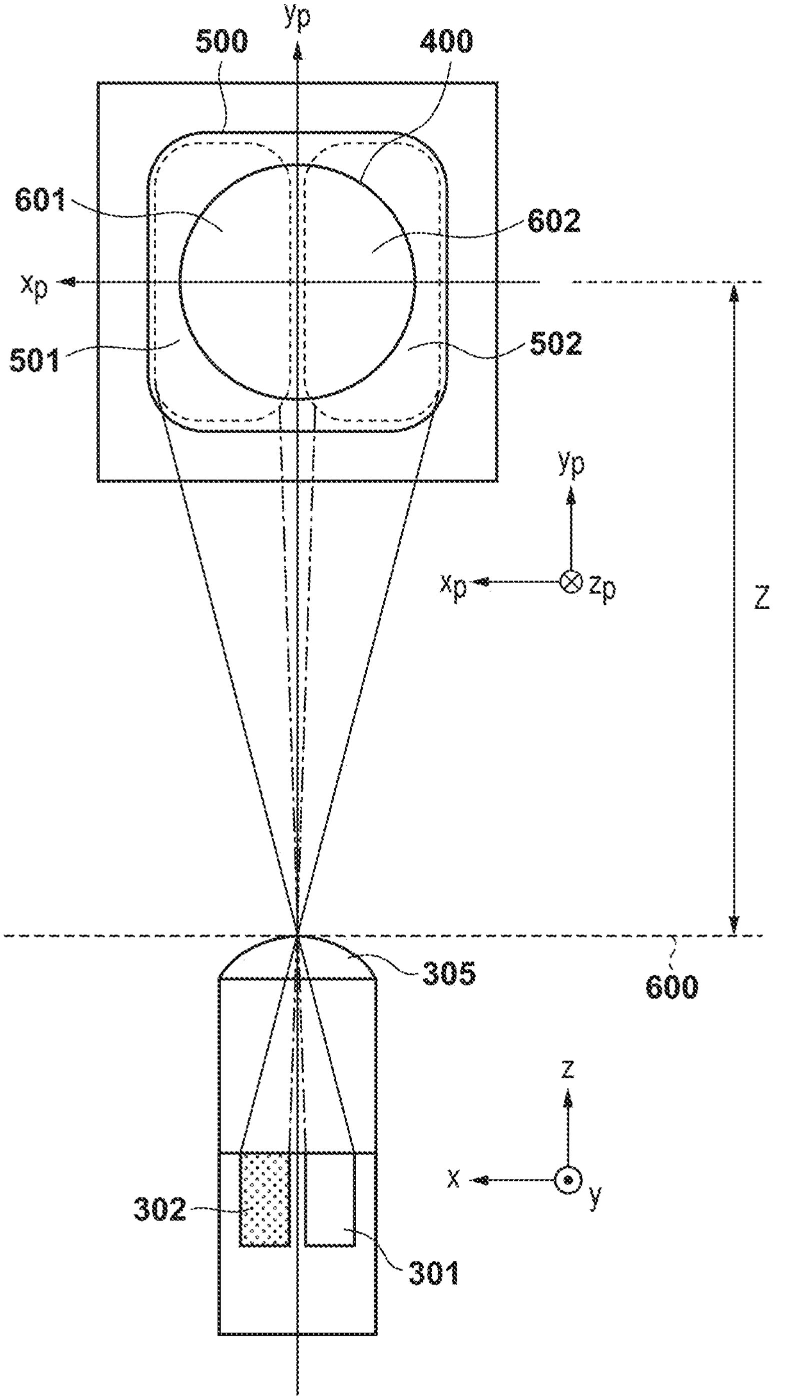
FIG. 4 is a diagram illustrating correspondence between a pixel in an image sensor according to an embodiment and a pupil intensity distribution.

FIG. 4 illustrates a cross-sectional view of an a-a cross-section of the pixel 200G arranged in the image sensor 107 of the present embodiment illustrated in FIG. 3A, seen from the +y side, as well as a pupil plane located a distance Z in the z axis direction (the direction of the optical axis OA) from an image capturing plane 600 of the image sensor 107. Note that in FIG. 4, the x axis and the y axis of the cross-sectional view are inverted with respect to FIGS. 3A and 3B in order to correspond to the coordinate axes of the exit pupil plane. The image capturing plane 600 of the image sensor 107 is located on an image formation plane of the image capturing optical system.

A pupil intensity distribution (first pupil intensity distribution) 501 is, through the microlens 305, in a substantially conjugate relationship with the light receiving surface of the first photoelectric conversion unit 301, a center of gravity position of which is eccentric in the −x direction. Accordingly, the first pupil intensity distribution 501 corresponds to a pupil region in which light can be received by the first sub-pixel 201. The center of gravity position of the first pupil intensity distribution 501 is eccentric to a +xp side on the pupil plane. Likewise, a pupil intensity distribution (second pupil intensity distribution) 502 is, through the microlens 305, in a substantially conjugate relationship with the light receiving surface of the second photoelectric conversion unit 302, a center of gravity position of which is eccentric in the +x direction.

Accordingly, the second pupil intensity distribution 502 corresponds to a pupil region in which light can be received by the second sub-pixel 202. The center of gravity of the second pupil intensity distribution 502 is eccentric to a −xp side on the pupil plane. A pupil intensity distribution 500 is a pupil region in which light can be received by the entire pixel 200G when all of the first photoelectric conversion units 301 and the second photoelectric conversion units 302 (the first sub-pixels 201 and the second sub-pixels 202) are combined. In other words, the first pupil intensity distribution 501 is eccentric to the +xp side on the pupil plane relative to the center of the pupil intensity distribution 500, and the second pupil intensity distribution 502 is eccentric to the −xp side on the pupil plane relative to the center of the pupil intensity distribution 500.

Additionally, in FIG. 4, a pupil region 500 is a pupil region through which light can be received by the entire pixel 200G when the photoelectric conversion units 301 and the photoelectric conversion units 302 (the first sub-pixels 201 and the second sub-pixels 202) are all combined.

Figure 5A:
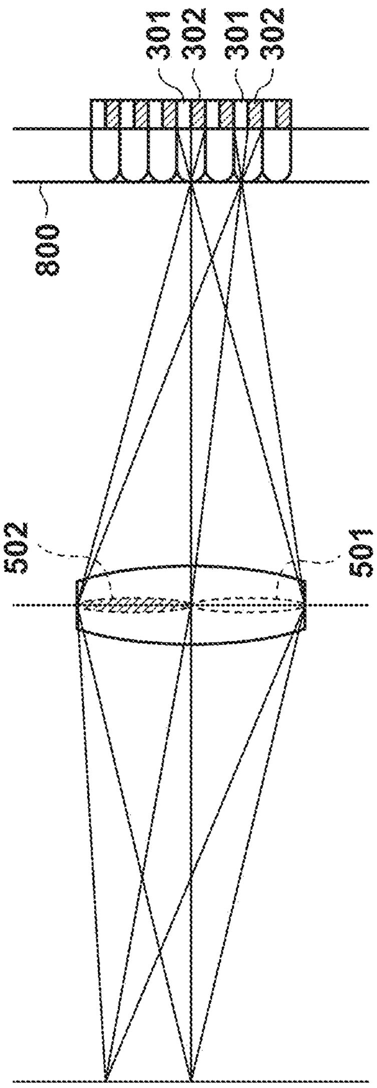
FIGS. 5A and 5B are diagrams illustrating a relationship between a defocus amount and an image shift amount according to an embodiment.

FIG. 5A is a schematic diagram illustrating the correspondence relationship between the image sensor and pupil divisions according to the present embodiment. Light fluxes passing through different partial pupil regions, namely a first partial pupil region 501 and a second partial pupil region 502, are incident on each (image capturing) pixel of the image sensor from an image capturing plane 800 at different angles, and are received by the photoelectric conversion units 301 and 302 divided into 2×1. Although the pupil region is pupil-divided into two in the horizontal direction in the present embodiment, pupil division may also be implemented in the vertical direction if necessary.

Image capturing pixels, each having the first sub-pixel 201 which receives the light flux passing through the first partial pupil region 501 of the image capturing optical system and the second sub-pixel 202 which receives the light flux passing through the second partial pupil region 502 of the image capturing optical system, different from the first partial pupil region, are arranged in the image sensor 107. Accordingly, each image capturing pixel receives a light flux passing through the pupil region 500, which is a combination of the first partial pupil region 501 and the second partial pupil region 502 of the image capturing optical system.

Note that instead of every pixel of the image sensor 107 having a plurality of photoelectric conversion units (sub-pixels), an image capturing pixel, a pixel having only the first sub-pixel, and a pixel having only the second sub-pixel may be arranged separately. Alternatively, a pixel having two sub-pixels and a pixel having one photoelectric conversion unit for two sub-pixels may be arranged.

In the present embodiment, the image processing circuit 125 generates one instance of phase detection AF image data (a first focus detection signal (an A image)) by concatenating a plurality of signals obtained by adding the outputs of the four first sub-pixels 201 for each unit of repetition of the color filters illustrated in FIG. 2. Additionally, the image processing circuit 125 generates a second focus detection signal (a B image) by concatenating a plurality of signals obtained by adding the outputs of the four second sub-pixels 202 for each unit of repetition of the color filters.

In this manner, the first and second sub-pixels 201 and 202 are used to generate focus detection signals, and are therefore also called focus detection pixels. By adding the outputs of the same type of sub-pixels present within the unit of repetition of the color filters, a signal reflecting the respective color components of R, G, and B is obtained, which can be treated as a luminance signal with little spectral sensitivity bias. Note that when obtaining a captured image, the signal is obtained by adding the output of the first sub-pixel 201 and the output of the second sub-pixel 202 in units of pixels.

Relationship Between Defocus Amount and Image Shift Amount

Figure 5B:
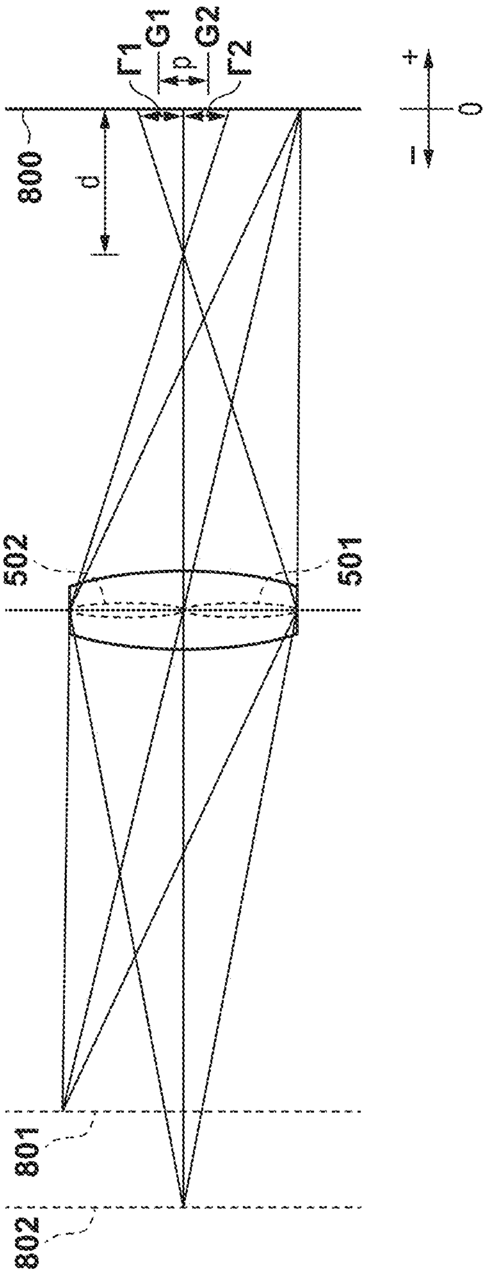

A relationship between an image shift amount in a pair of focus detection signals (the A image and the B image) generated by the image processing circuit 125, and a defocus amount of the optical system with respect to the subject (a focus condition) in the present embodiment, will be described next. FIG. 5B is a diagram schematically illustrating the relationship between the defocus amount and an image shift amount between the first focus detection signal (the A image) and the second focus detection signal (the B image). The image sensor 107 is arranged on the image capturing plane 800, and as described with reference to FIGS. 4 and 5A, the exit pupil of the image capturing optical system is divided into two regions, namely the first partial pupil region 501 and the second partial pupil region 502.

A magnitude $|d|$ of a defocus amount d is a distance from an image formation position of the subject to the image capturing plane 800. When the defocus amount d is negative ($d<0$), this indicates a forward focus state in which the image formation position of the subject is on the subject side of the image capturing plane 800, whereas when the defocus amount d is positive ($d>0$), this indicates a rearward focus state in which the image formation position of the subject is on the opposite side of the subject from the image capturing plane 800. The magnitude of the defocus amount d is 0 in an in-focus state, in which the image formation position of the subject is located on the image capturing plane 800. FIG. 5A illustrates an example in which a subject 801 is in an in-focus state ($d=0$), and a subject 802 is in a forward focus state ($d<0$). The forward focus state ($d<0$) and the rearward focus state ($d>0$) will be collectively referred to as a defocus state ($|d|>0$).

In the forward focus state ($d<0$), of the light flux from the subject 802, a light flux passing through the first partial pupil region 501 (the second partial pupil region 502) is first focused at a position further on the subject side than the image capturing plane 800. The light flux then spreads to a width $\Gamma 1$ ($\Gamma 2$) centered on a center of gravity position G1

(G2) of the light flux, becoming a blurry image at the image capturing plane 800. The blurry image is converted into an electrical signal by the first sub-pixel 201 (the second sub-pixel 202) in each of the plurality of pixels which receives the light flux. Then, as described above, the phase detection AF unit generates the first focus detection signal (the A image) from the signal from the first sub-pixel 201, and generates the first focus detection signal (the B image) from the signal from the second sub-pixel 202. Accordingly, the A image (the B image) is recorded as a subject image in which the subject 802 is blurred at the width Γ1 (Γ2) at the center of gravity position G1 (G2) on the image capturing plane 800.

The blur width Γ1 (Γ2) of the subject image increases roughly proportionally with an increase in the magnitude |d| of the defocus amount d. Similarly, a magnitude |p| of an image shift amount p of the subject image between the first focus detection signal and the second focus detection signal (p=a difference between the center of gravity positions of the light fluxes, i.e., G1−G2) also increases roughly proportionally with an increase in the magnitude |d| of the defocus amount d. In the rearward focus state (d>0), the magnitude |d| of the defocus amount has a similar relationship with the blur width of the subject image and the image shift amount p, except that the direction in which the A image and the B image are shifted is opposite from that in the forward focus state.

Accordingly, the magnitude of the image shift amount between the A image and the B image increases with the increase in the magnitude of the defocus amount.

Focus Detection Region

Figure 6:
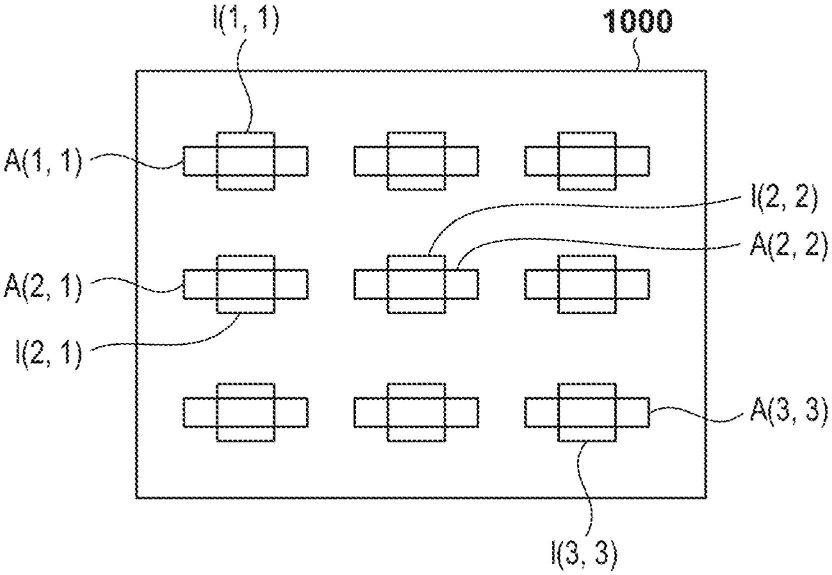
FIG. 6 is a diagram illustrating a focus detection region according to an embodiment.

The region, of the pixel region of the image sensor 107, which is used to generate the first focus detection signal and the second focus detection signal (that is, a focus detection region), will be described next. FIG. 6 illustrates an example of focus detection regions set in an effective pixel region 1000 of the image sensor 107, overlaid with an indicator of the focus detection regions displayed in the display unit 131 during focus detection. Although the present embodiment assumes that a total of nine focus detection regions, namely three in the row direction and three in the column direction, are set, this is merely one example, and a greater or smaller number of focus detection regions may be set. The sizes, positions, and spacing of the focus detection regions may be different as well.

Furthermore, when all of the pixels in the effective pixel region 1000 include the first sub-pixel 201 and the second sub-pixel 202, as in the image sensor 107, the positions, sizes, and the like of the focus detection regions may be set dynamically. For example, a predetermined range may be set as a focus detection region, centered on a position specified by the user. In the present embodiment, the focus detection regions are set so as to obtain a higher-resolution focus detection result when obtaining a defocus map, which will be described later. For example, each of a total of 9600 regions, obtained by dividing the effective pixel region 1000 into 120 parts in the horizontal direction and 80 parts in the vertical direction, is set as a focus detection region.

In FIG. 6, an nth focus detection region in the row direction and an mth focus detection region in the column direction are denoted as A(n,m), and a rectangular frame-shaped indicator representing the A(n,m) focus detection region is denoted as I(n,m). The signals obtained from the first sub-pixels 201 and the second sub-pixels 202 in the focus detection region are used to generate the A image and the B image used to detect the defocus amount in that focus detection region. Additionally, the indicator I(n,m) is normally displayed superimposed on the live view image.

Operations in Image Capture Mode

Figure 7:
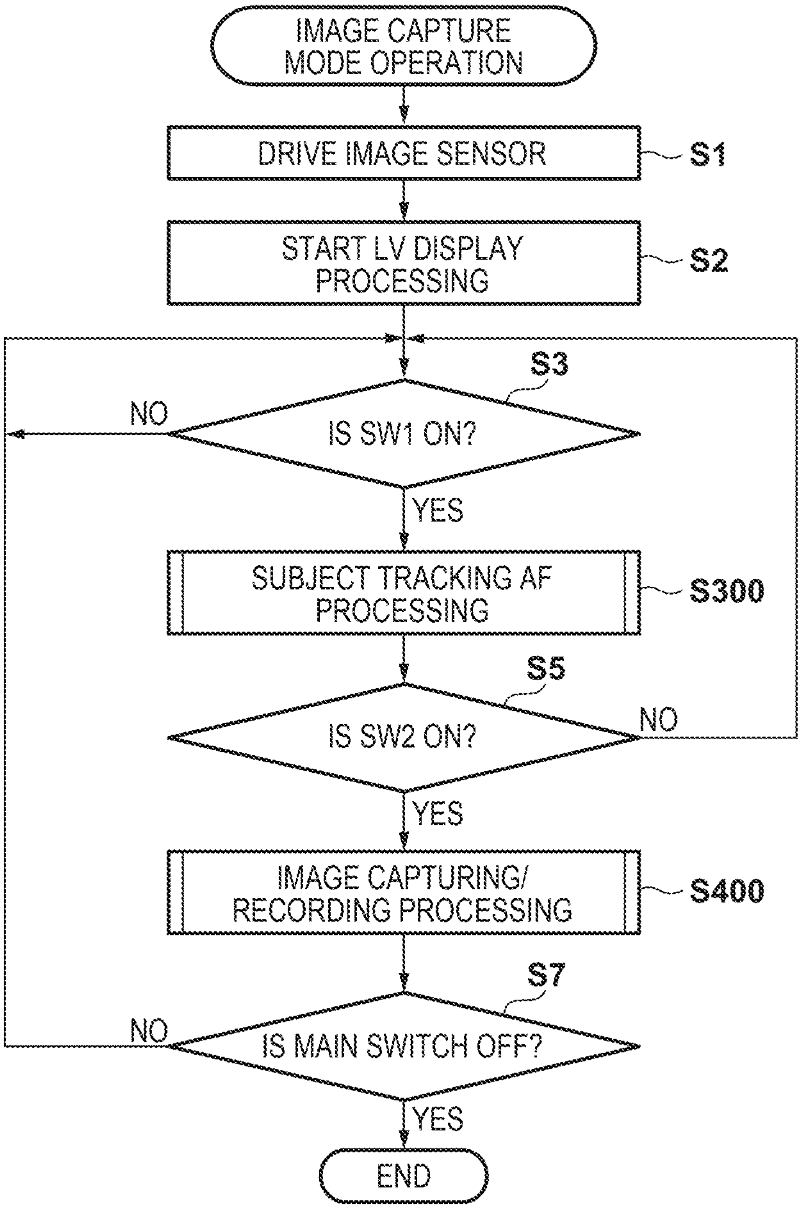
FIG. 7 is a flowchart pertaining to shooting mode operations according to an embodiment.

Operations performed in an image capture mode of the camera 100 will be described with reference to the flowchart in FIG. 7. The camera 100 operates in the image capture mode when the power is turned on and startup processing is complete.

In the image capture mode, the camera 100 stands by for the input of a user instruction while causing the display unit 131 to function as an EVF by continually capturing a moving image and displaying the obtained moving image in the display unit 131.

In step S1, the CPU 121 starts driving the image sensor 107 through the image sensor drive circuit 124 to capture a moving image for display in the display unit 131. Thereafter, the image sensor 107 outputs an analog image signal at a predetermined frame rate.

Upon obtaining one frame's worth of the analog image signal from the image sensor 107, the CPU 121 applies correlated double sampling, A/D conversion, and the like to generate a digital image signal. The CPU 121 outputs the digital image signal to the image processing circuit 125. The image processing circuit 125 applies demosaicing and the like to the digital image signal, and generates display image data. The image processing circuit 125 writes the display image data into a video memory region in the RAM 136, for example. Additionally, the image processing circuit 125 generates, from the digital image signal, evaluation values used in AE processing, and outputs the evaluation values to the CPU 121. Furthermore, for each of the plurality of focus detection regions, the image processing circuit 125 generates, and outputs to the CPU 121, the first and second focus detection signals, based on the signals read out from the pixels included in the focus detection region.

Note that when the first and second sub-pixels 201 and 202 are configured as separate pixels (that is, do not share the same microlens), the pixel coordinates from which the signal is obtained from the first sub-pixel 201 and the pixel coordinates for which the signal is obtained from the second sub-pixel 202 are different. Accordingly, the image processing circuit 125 generates the first and second focus detection signals by interpolating the signals such that signal pairs of the first and second sub-pixels 201 and 202 are present at the same pixel position.

In step S2, the CPU 121 supplies the display image data, which is stored in a video memory region of the RAM 136, to the display unit 131, and causes one frame of a live view image to be displayed. The user can adjust an image capture range, exposure conditions, and the like while viewing the live view image displayed in the display unit 131. The CPU 121 determines the exposure conditions based on the evaluation values obtained from the image processing circuit 125, and displays an image indicating the determined exposure conditions (shutter speed, aperture value, image capture ISO sensitivity) in the display unit 131 superimposed on the live view image.

Thereafter, the CPU 121 executes the operations of step S2 each time image capturing is completed for one frame. As a result, the display unit 131 functions as an EVF.

In step S3, the CPU 121 determines whether the release switch included in the operation unit 132 being depressed halfway (SW1 turning on) has been detected. The CPU 121 repeats step S3 if it is determined that SW1 turning on has not been detected. On the other hand, the CPU 121 executes step S300 if it is determined that SW1 turning on has been detected.

In step S300, the CPU 121 executes subject tracking autofocus (AF) processing. In step S300, the CPU 121 applies subject detection processing to the display image data, determines the focus detection region, and so on. The CPU 121 also executes predictive AF processing and the like to suppress a drop in the AF accuracy caused by a time difference between when the AF processing is executed and when the release switch being fully depressed (SW2 turning on) is detected. The operations performed in step S300 will be described in detail later.

In step S5, the CPU 121 determines whether SW2 turning on has been detected. The CPU 121 executes step S3 if it is determined that SW2 turning on has not been detected. On the other hand, the CPU 121 executes image capturing/recording processing in step S400 if it is determined that SW2 turning on has been detected. The operations performed in step S400 will be described in detail later.

In step S7, the CPU 121 determines whether a main switch included in the operation unit 132 turning off has been detected. The CPU 121 ends the operations of the image capture mode if it is determined that the main switch turning off has been detected. On the other hand, the CPU 121 executes step S3 if it is determined that the main switch turning off has not been detected.

Although the subject detection processing and the AF processing are described as being executed in response to a determination that SW1 turning on has been detected, the processing may be executed at other times. If the subject tracking AF processing of step S300 is executed before SW1 turning on is detected, the half-press operation can be omitted, and image capturing can be started immediately with a full-press operation.

Image Capturing/Recording Processing

Figure 8:
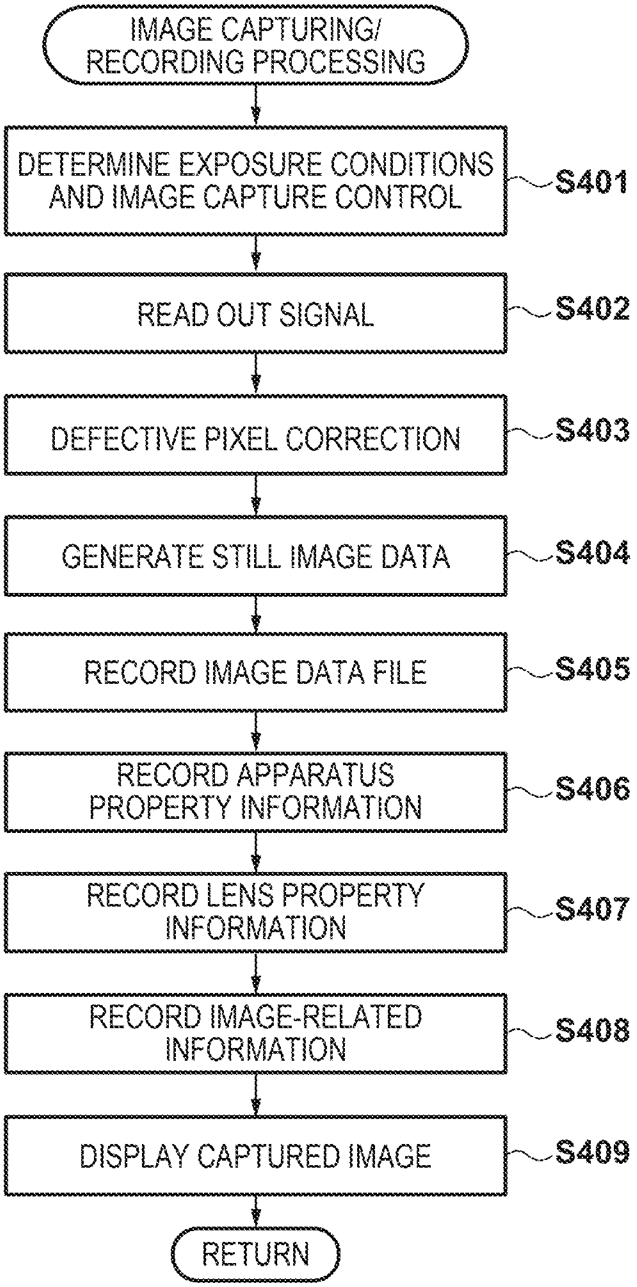
FIG. 8 is a flowchart pertaining to image capturing/recording processing according to an embodiment.

The image capturing/recording processing executed by the CPU 121 in step S400 in FIG. 7 will be described next with reference to the flowchart illustrated in FIG. 8.

In step S401, the CPU 121 determines the exposure conditions (shutter speed, aperture value, image capture ISO sensitivity, and the like) through AE processing based on the evaluation values generated by the image processing circuit 125. Then, the CPU 121 controls the operations of the respective units to capture a still image according to the determined exposure conditions.

In other words, the CPU 121 transmits the aperture value and the shutter speed to the aperture drive circuit 128 and drives the aperture stop 102. The CPU 121 also controls charge accumulation operations of the image sensor 107 through the image sensor drive circuit 124.

In step S402, the CPU 121 reads out one frame's worth of an analog image signal from the image sensor 107 through the image sensor drive circuit 124. Note that the signals of one of the first and second sub-pixels 201 and 202 are also read out for at least the pixels within the focus detection region.

In step S403, the CPU 121 A/D converts the signal output in step S402 to obtain a digital image signal. The CPU 121 also applies defective pixel correction processing to the digital image signal using the image processing circuit 125. The defective pixel correction processing is processing of supplementing signals read out from pixels from which normal signals cannot be read out (defective pixels) with signals read out from surrounding normal pixels.

In step S404, the CPU 121 causes the image processing circuit 125 to generate a still image data file for recording, as well as the first and second focus detection signals. The image processing circuit 125 applies image processing, encoding processing, and the like to the digital image signal after the defective pixel correction processing, and generates still image data for recording. The image processing may include, for example, demosaicing (color interpolation) processing, white balance adjustment processing, γ correction (tone correction) processing, color conversion processing, edge enhancement processing, and the like. The image processing circuit 125 also applies, to the still image data, encoding processing using a method based on the format of the data file that stores the still image data.

In step S405, the CPU 121 records, in the recording medium 133, the image data file which holds the still image data generated in step S404 and the signals of the sub-pixels read out from the focus detection region in step S402.

In step S406, the CPU 121 records apparatus property information as property information of the camera 100 in association with the image data file recorded in step S405 in the recording medium 133.

The apparatus property information includes the following information, for example.

- image capture conditions (aperture value, shutter speed, image capture sensitivity, and the like)
- information on the image processing applied to the digital image signal by the image processing circuit 125
- information on a light reception sensitivity distribution of the image capturing pixels and the sub-pixels in the image sensor 107
- information on vignetting of the image capture light flux within the camera 100
- information on the distance from the mounting surface of the image capturing optical system to the image sensor 107 in the camera 100
- information on manufacturing error in the camera 100

The information on the light reception sensitivity distribution of the image capturing pixels and the sub-pixels (called simply "light reception sensitivity distribution information" hereinafter) is information on a light reception sensitivity of the image sensor 107 according to a distance from a point of intersection between the image sensor 107 and the optical axis. The light reception sensitivity depends on the microlenses 305 and the photoelectric conversion units 301 and 302 in the pixels, and may therefore be information on those elements. The light reception sensitivity distribution information may be information on changes in the sensitivity relative to the incident angle of light.

In step S407, the CPU 121 records lens property information, as property information of the image capturing optical system, in the recording medium 133 in association with the still image data file recorded in step S405.

The lens property information includes the following information, for example.

- information on the exit pupil
- information on frames in the lens barrel and the like which cause vignetting of the light flux
- information on the focal length, F number, and the like during image capture
- information on aberration in the image capturing optical system
- information on manufacturing error in the image capturing optical system
- the position of the focus lens 105 during image capture (a subject distance)

Next, in step S408, the CPU 121 records image-related information, as information on the still image data, in the recording medium 133 in association with the still image data file recorded in step S405. The image-related information includes, for example, information on focus detection operations before image capture, information on movement of the subject, and information on focus detection accuracy.

Note that in steps S406 to S408, the CPU 121 may store the apparatus property information, the lens property information, and the image-related information in the RAM 136 in association with the image data file recorded in step S405.

In step S409, the CPU 121 generates display image data by causing the image processing circuit 125 to scale the still image data, and displays the generated display image data in the display unit 131. The user can therefore confirm the captured image. The CPU 121 ends the image capturing/recording processing when a pre-set display time passes.

Subject Tracking AF Processing

Figure 9:
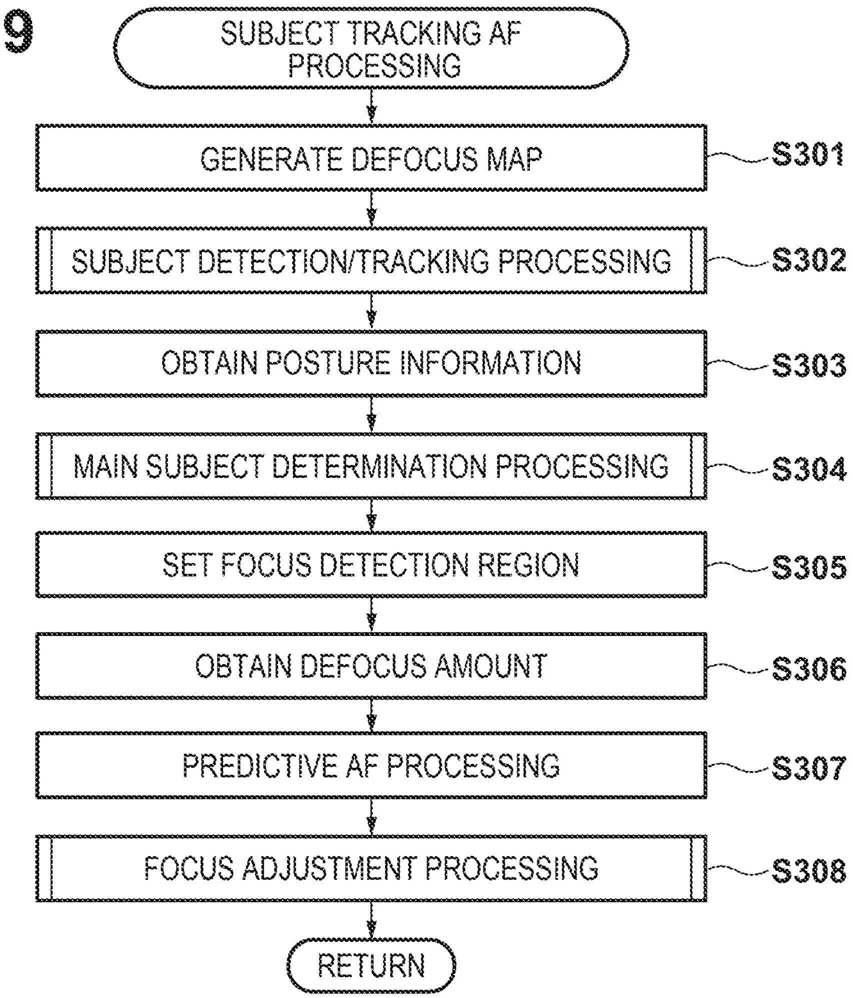
FIG. 9 is a flowchart pertaining to subject tracking AF processing according to an embodiment.

The subject tracking AF processing performed in step S300 of FIG. 7 will be described next with reference to the flowchart in FIG. 9.

In step S301, the CPU 121 calculates the image shift amount (a phase difference) between the first and second focus detection signals generated for each of the plurality of focus detection regions in step S2. The image shift amount between the signals can be obtained as a relative position where the amount of correlation between the signals is maximum. The CPU 121 calculates a defocus amount as a focus condition for each focus detection region, from the calculated image shift amount.

As described above, in the present embodiment, each of a total of 9600 regions, obtained by dividing the effective pixel region 1000 into 120 parts in the horizontal direction and 80 parts in the vertical direction, is set as a focus detection region. The CPU 121 generates data in which the defocus amount calculated for each region is associated with the position of the region (a defocus map). The CPU 121 stores the generated defocus map in the RAM 136, for example.

In step S302, the CPU 121 executes subject detection processing using the subject detection unit 140. The subject detection unit 140 detects regions of at least one type of subject, and outputs, to the CPU 121, a detection result including the type of the subject, the position and size of the region, the reliability of the detection, and the like for each detected region.

Additionally, the CPU 121 performs processing for detecting the position of the subject and the current frame (tracking processing) based on the result of the subject detection processing in the current frame and the result of the subject detection processing in past frames. Note that when the subject cannot be detected through subject detection processing using a trained CNN included in the subject detection unit 140, the CPU 121 can estimate the position of the subject in the current frame through tracking processing using another method, such as template matching or the like. This will be described in detail later.

In step S303, if a region of a subject having joints (e.g., a human) is detected by the subject detection unit 140 as a subject region, the CPU 121 obtains posture information of individuals subject regions using the posture obtaining unit 142.

Figure 11A:
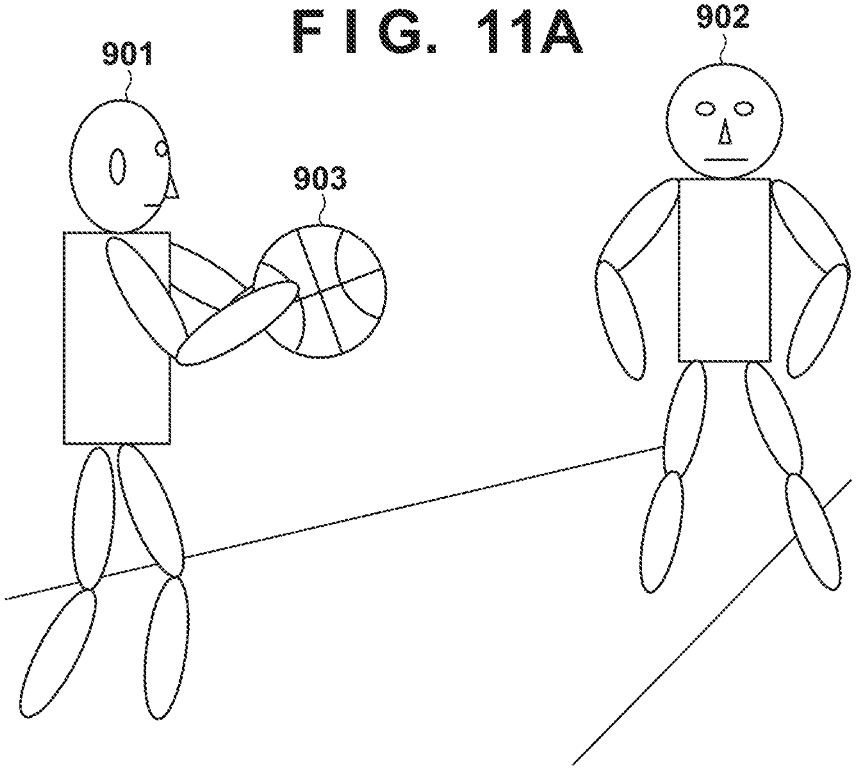
FIGS. 11A and 11B are descriptive diagrams illustrating posture information according to an embodiment.

An example of the posture information obtained by the posture obtaining unit 142 will be described with reference to FIGS. 11A and 11B. It is assumed here that in the image of the current frame illustrated in FIG. 11A, regions of human subjects 901 and 902, and a region of a ball 903, have been detected as subject regions.

The subject 901 is holding the ball 903 with both hands, and is an important subject in the captured scene (a main subject). In the present embodiment, the subject on which the photographer is likely trying to focus (the main subject) is determined based on the posture information obtained from the subject region. On the other hand, the subject 902 is a non-main subject. The non-main subject is a subject, among the detected subjects, which is not the main subject.

Figure 11B:
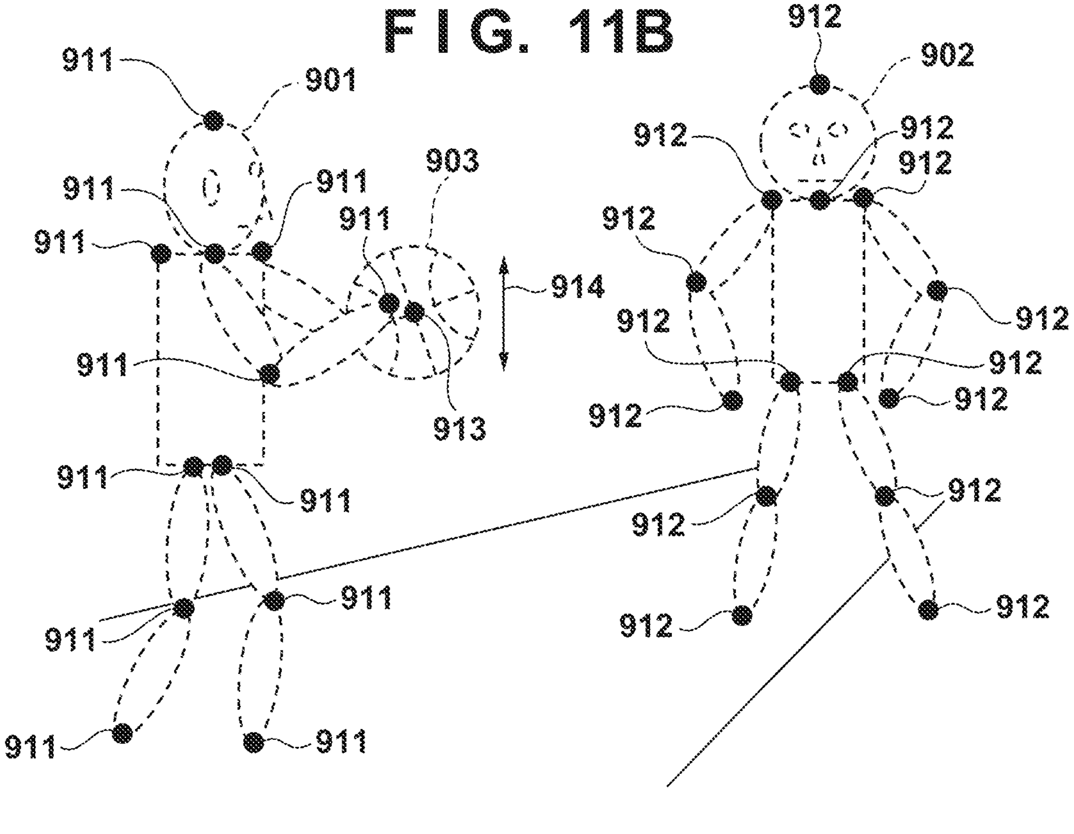

FIG. 11B is a diagram illustrating an example of the posture information of the subjects 901 and 902, and the position and size of the ball 903. The posture obtaining unit 142 detects the positions of joints 911 of the subject 901 as the posture information of the subject 901. Similarly, the posture obtaining unit 142 detects the positions of joints 912 of the subject 902 as posture information.

FIG. 11B illustrates an example in which the positions of the top of the head, the neck, the shoulders, the elbows, the wrists, the hips, the knees, and the ankles are detected as the positions of the joints. However, the joint positions detected by the posture obtaining unit 142 may be only some of these, and other joint positions may be detected as well. In addition to the joint positions, information such as axes connecting joints to each other may be detected as the posture information. Any information on the posture of the subject can be detected as the posture information. It is assumed here that the posture obtaining unit 142 detects the joint positions as the posture information of a human subject.

The posture obtaining unit 142 detects image coordinates (x,y) of the joints 911 and the joints 912. Here, the image coordinates (x,y) are coordinates of a pixel position within the image, expressed through a two-dimensional orthogonal coordinate system which takes the center pixel of the image or the pixels in the four corners as one origin (0,0).

Additionally, in step S302, the subject detection unit 140 detects information including the image coordinates (x,y) of a center of gravity 413 and a size thereof in the image (the number of pixels of the length indicated by the arrow 914) for the region detected as the ball subject 903.

In step S304, the CPU 121 performs main subject determination processing. The CPU 121 determines the main subject from among the detected subjects using the defocus map generated in step S301, the subject detection results obtained in step S302, and the posture information obtained in step S303. The main subject is the subject thought to be the most likely that the photographer is intending to focus on. Details of the main subject determination processing will be given later.

In step S305, the CPU 121 sets the focus detection region to include the region of the main subject determined in step S304. The CPU 121 sets at least one focus detection region, among the 9600 focus detection regions which can be set, which is a focus detection region included in the region of the main subject and for which the detected defocus amount satisfies a condition, for example. The condition may be, for example, that a value indicating the reliability of the defocus amount is at least a threshold and that the defocus amount indicates a subject distance on the near side.

Note that the setting of the focus detection region in step S305 may be performed based on the defocus amount obtained in the next frame for all the focus detection regions included in the region of the main subject determined in step S304.

In step S306, the CPU 121 obtains the defocus amount for the focus detection region set in step S305. The defocus amount obtained here may be that calculated in step S301, or may be a defocus amount calculated again for a new frame.

In step S307, the CPU 121 executes predictive AF processing for each of the subject regions detected by the subject detection unit 140 in step S402. The predictive AF processing is processing for predicting the defocus amount of a subject region at the point in time when the next frame will be captured. The CPU 121 generates time series data of the defocus amount for individual subject regions based on the defocus map generated in S401 for at least one past frame and the current frame, for example. Then, based on the time series data of the defocus amount, the CPU 121 uses multivariate analysis (e.g., the least squares method) to obtain an equation of a prediction curve. The CPU 121 predicts the defocus amount corresponding to the subject distance at the time of shooting the next frame by substituting the time of shooting the next frame into the obtained equation of the prediction curve. Note that time series data of the position of the subject region may be generated and a three-dimensional position of the subject at the time of shooting the next frame may be predicted.

For example, the three-dimensional position (X, Y, Z) of a subject is expressed in an XYZ orthogonal coordinate system with the point of intersection of the image capturing plane and the optical axis serving as the origin and the optical axis serving as the Z axis. The three-dimensional position of the subject at the time of shooting the next frame can be predicted from the image coordinates (X, Y) of the subject region and the time series data of a defocus amount Z.

For human subjects, the defocus amount corresponding to the subject distance at the time of shooting the next frame may be predicted from time series data of the joint positions. Using time series data makes it possible to estimate the positions even when joint positions cannot be detected due to being hidden by other subjects. Whether a subject is partially hidden or the subject is out of the frame can be determined by the number, positions, and the like of the joint positions that cannot be detected.

In step S308, the CPU 121 executes focus adjustment processing for capturing the next frame based on the defocus amount predicted in step S307 for the main subject. The CPU 121 converts the defocus amount into a drive direction and drive amount of the focus lens, controls the focus actuator 114 through the focus drive circuit 126, and drives the focus lens 105. This will be described in detail later. Once the driving of the focus lens 105 is complete, the CPU 121 ends the subject tracking AF processing.

Subject Detection/Tracking Processing

Figure 10:
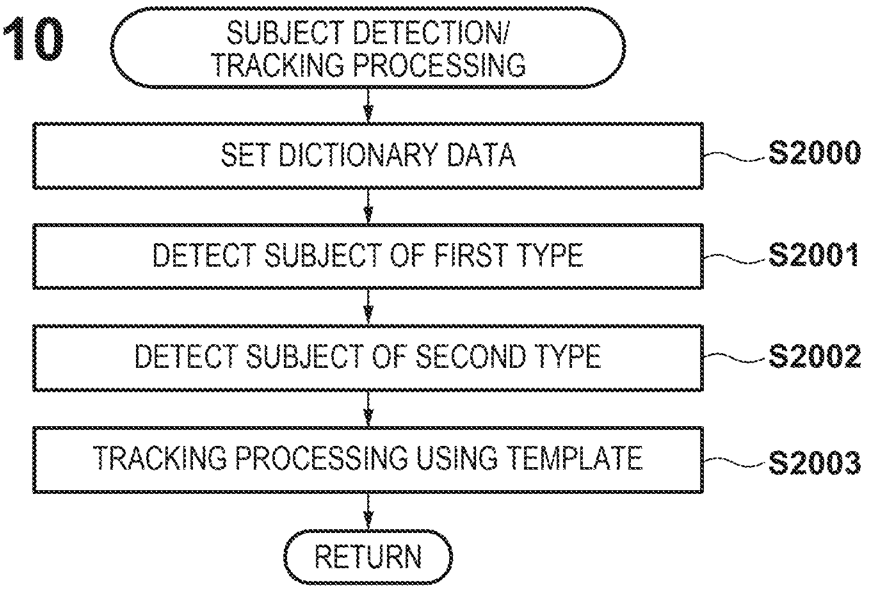
FIG. 10 is a flowchart pertaining to subject detection/tracking processing according to an embodiment.

The subject detection/tracking processing performed in step S302 of FIG. 9 will be described in detail next with reference to the flowchart in FIG. 10.

In step S2000, the CPU 121 sets the dictionary data to be used by the subject detection unit 140 by determining the type of subject to be detected by the subject detection unit 140. The type of subject to be detected can be determined based on a pre-set priority level, settings in the camera 100 (e.g., a shooting mode), and the like. For example, assume that dictionary data for "person", "vehicle", "animal", and "ball" is stored in the dictionary data storage unit 141. Note that the subject types may be classified in more detail. For example, dictionary data such as "dog", "cat", "bird", "cow", or the like may be stored instead of "animal", and "four-wheeled vehicle", "two-wheeled vehicle", "train", "airplane", or the like may be stored instead of "vehicle".

When the camera 100 is set to a shooting mode for shooting a specific type of subject, the CPU 121 sets the dictionary data for that subject type. For example, if portrait mode or sports mode is set, dictionary data for "person" is set. If in sports mode, the dictionary data for "ball" is set as well. If a "panning shooting mode" is set, the dictionary data for "vehicle" is set as well.

When the camera 100 is not set to a shooting mode for shooting a specific type of subject, the CPU 121 sets the dictionary data for the subject according to a pre-set priority level. For example, dictionary data for "person" and "animal" can be set.

The method of determining the type of the dictionary data and the dictionary data to be set is not limited to the method described here. One or more instances of the dictionary data may be set. If one instance is set, subjects which can be detected using one instance of dictionary data can be detected with high frequency. If a plurality of instances of dictionary data are set, a plurality of types of subjects can be detected by switching dictionaries on a frame-by-frame basis. Note that if the processing time allows, a plurality of types of subjects may be detected for the same frame. When detecting one type of subject per frame, a detection frequency of a type of subject having a first priority level may be set to be higher than the detection frequency of a type of subject having a lower second priority level. It is assumed here that dictionary data for "person" and "ball" are set. For convenience, the following descriptions assume that subjects of the first and second type are detected in the same frame.

In step S2001, the CPU 121 applies detection processing for the first type of subject to the image of the current frame using the subject detection unit 140. Assume here that the first type of subject is "person". The subject detection unit 140 applies the subject detection processing to the image of the current frame using the "person" dictionary data stored in the dictionary data storage unit 141. The subject detection unit 140 outputs a detection result to the CPU 121. At this time, the CPU 121 may display the subject detection result in the display unit 131. The CPU 121 also stores the detected subject region in the RAM 136.

Note that when "person" dictionary data is set, the subject detection unit 140 detects a plurality of types of regions having different granularities with respect to the person, such as a "whole body" region, a "face" region, and an "eye" region. It is desirable that local regions, such as a person's eyes and face, be detected for use in focus detection, exposure control, and the like, but these may not be detected due to the face not facing forward or being hidden by other subjects. On the other hand, it is unlikely that the whole body will be completely undetectable. Accordingly, regions of a plurality of types having different granularities are detected, which increases the likelihood that some region of the "person" can be detected. Note that the dictionary data can be configured to detect regions of a plurality of types having different granularities for types of subjects other than people.

In step S2002, the CPU 121 applies detection processing for the second type of subject to the image of the current frame using the subject detection unit 140. Assume here that the second type of subject is "ball". The subject detection unit 140 applies the subject detection processing to the image of the current frame using the "ball" dictionary data stored in the dictionary data storage unit 141. The subject detection unit 140 outputs a detection result to the CPU 121. At this time, the CPU 121 may display the subject detection result in the display unit 131.

Instead of subject detection using "ball" dictionary data, object detection processing may be combined with processing for recognizing a ball from detected objects. The object detection processing can use any publicly-known method, such as YOLO. "YOLO" is the method (or a successive version of the method) described in "Redmon, Joseph, et al., 'You only look once: Unified, real-time object detection.', Proceedings of the IEEE conference on computer vision and pattern recognition, 2016". Note that "ball" also includes badminton shuttles, ice hockey pucks, and the like. Sports equipment used with the hands, such as rackets, bats, golf clubs, and the like, may be detected as well.

In step S2003, the CPU 121 executes subject tracking processing by applying template matching processing to the current frame using the subject region most recently detected in step S2001 as a template. The image itself of the subject region may be used as the template, or information obtained from the subject region, such as luminance information, color histogram information, feature point information such as corners and edges, or the like may be used as a template. Any publicly-known method for matching, updating a template, or the like can be used. The result of the tracking processing may be the position and size of the region most similar to the template in the current frame.

The tracking processing in step S2003 may be performed only when no subject of the first type is detected in step S2001. By detecting, in the current frame, a region similar to the subject region detected in the past, stable subject detection/tracking processing can be achieved. The CPU 121 ends the subject detection/tracking processing by ending the tracking processing.

Main Subject Determination Processing

Figure 12:
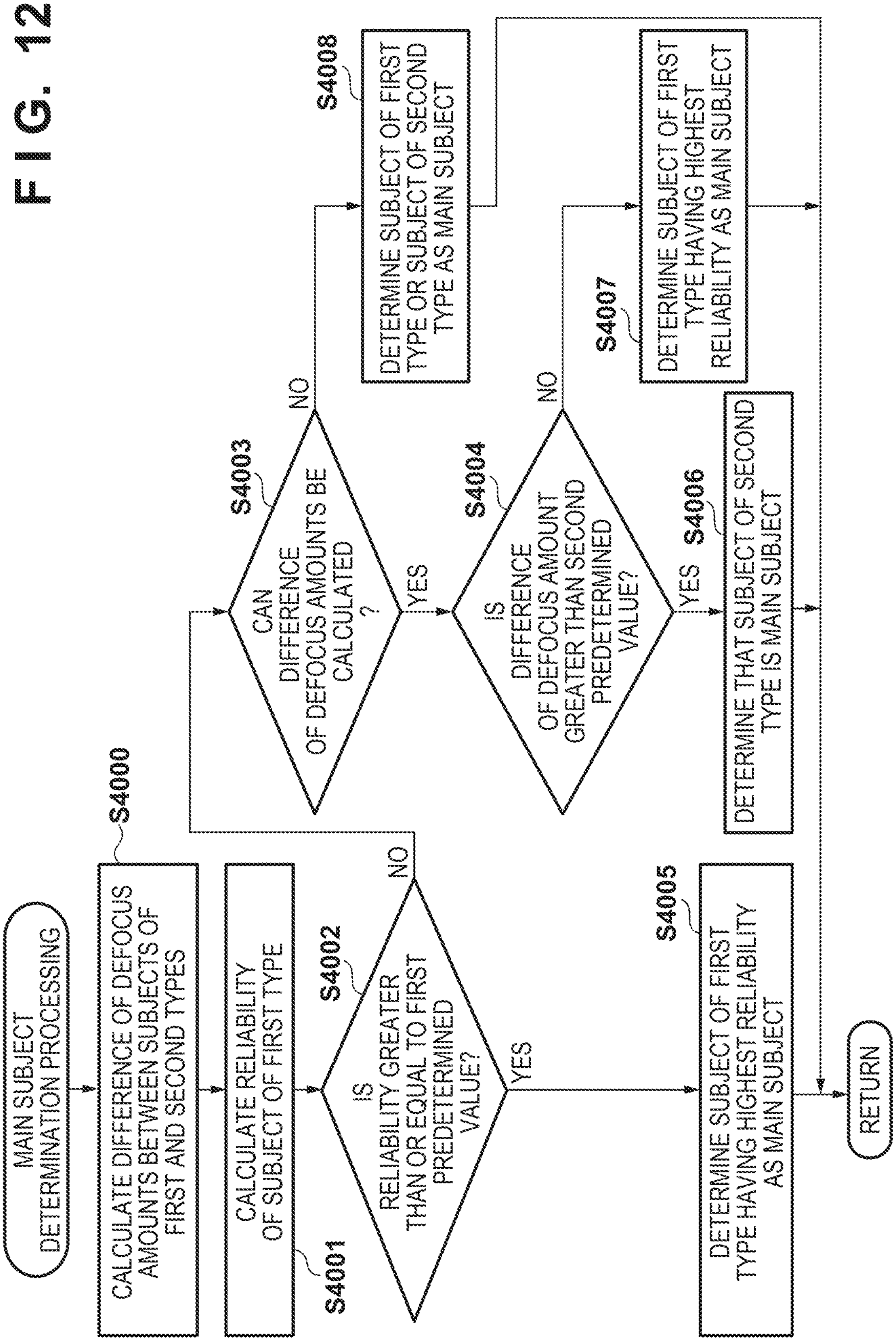
FIG. 12 is a flowchart pertaining to main subject determination processing according to an embodiment.

The main subject determination processing in step S304 of FIG. 9 will be described in detail next with reference to the flowchart in FIG. 12.

In step S4000, the CPU 121 obtains, from the defocus map generated in step S301, the defocus amounts corresponding to the first and second types of subject regions detected in the subject detection/tracking processing. The CPU 121 then calculates the difference between the defocus amounts corresponding to the first and second types of subject regions. When a plurality of at least one of the first and second types of subject regions are detected, the difference between the defocus amounts is calculated for each combination.

In step S4001, the CPU 121 calculates probability or reliability that the subject of the first type is the main subject. Although a case where the probability that the subject of the first type is the main subject in the image is calculated will be described here, other probabilities or reliabilities may be calculated instead. For example, the inverse of a distance between the center of gravity position of the first type of subject region and the center of gravity position of the second type of subject region may be calculated as the reliability.

Probability Calculation Method

Because the subject of the first type is a person, a method for calculating the probability that the subject of the first type is the main subject based on joint positions and sizes will be described here. A method using a neural network will be described.

Figure 13:
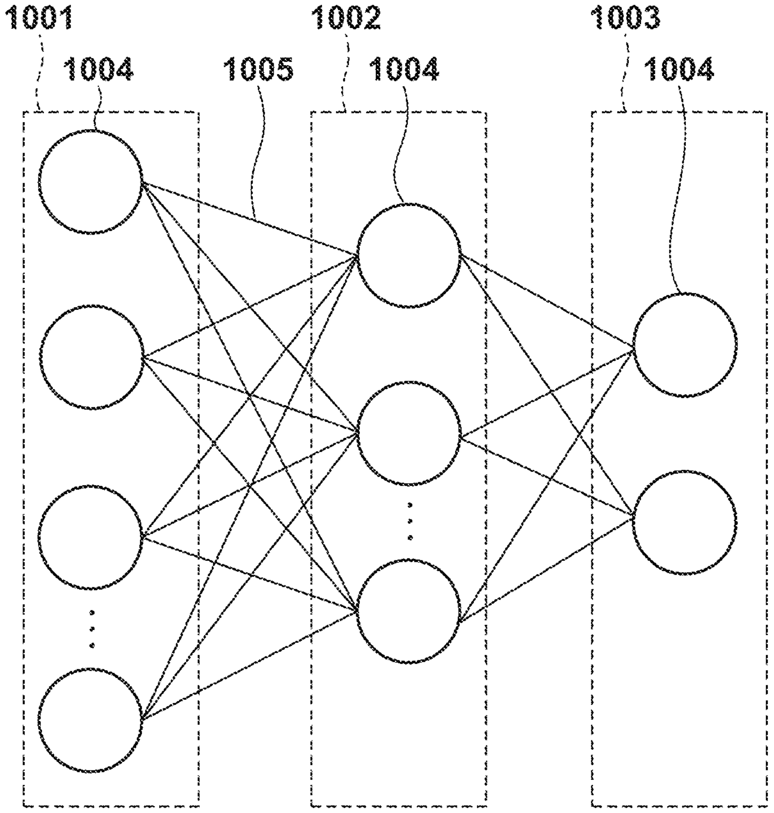
FIG. 13 is a diagram illustrating an example of the structure of a neural network according to an embodiment.

FIG. 13 is a diagram illustrating an example of the structure of a neural network. The neural network has an input layer 1001, an intermediate layer 1002, and an output layer 1003. The intermediate layer 1002 may have a plurality of layers. A plurality of neurons 1004 are present in each layer, and the neurons 1004 in adjacent layers are connected to each other by synapses 1005.

The number of the neurons 1004 in the input layer 1001 is equal to the dimension of the input data. The number of neurons in the output layer 1003 is equal to the number of answers. Here, the neural network is used to obtain two types of answers, namely whether a given type of subject is the main subject or not, and thus there are two neurons 1004 in the output layer. A neural network that classifies the input into two classes is used to determine whether the subject of the first type is the main subject or not (whether or not the probability is high).

Here, assume that $w_{ij}$ is the weight of the synapse 1005 that connects an i-th neuron 1004 of the input layer 1001 to a j-th neuron of the intermediate layer 1002. At this time, an output $z_j$ of the j-th neuron in the intermediate layer 1002 is given by the following equations.

$$z_j = h\left(b_j + \sum_i w_{ji} x_i\right) \tag{1}$$

$$h(z) = \max(z, 0) \tag{2}$$

In Equation (1), $x_i$ represents the value input to the i-th neuron in the input layer 1001. Because all neurons in the input layer 1001 are connected to the j-th neuron in the intermediate layer 1002, the input values of the neurons are weighted and added to the j-th neuron in the intermediate layer 1002.

The j-th neuron in the intermediate layer 1002 outputs the value of an activation function h, which has, as an argument, the input value plus a bias $b_j$. The bias $b_j$ is a parameter corresponding to the sensitivity of the neuron. The activation function h is a function that converts the input value into a value representing an excitation state of the neuron. Although Rectified Linear Unit (ReLU) is used here, another function, such as a sigmoid function or the like, may be used instead.

Assume that $w_{kj}$ is the weight of the synapse 1005 connecting the j-th neuron in the intermediate layer 1002 to a k-th neuron in the output layer 1003, and $b_k$ is the bias of the k-th neuron in the output layer 1003. At this time, a value $y_k$, which is output by the k-th neuron 1004 in the output layer 1003, is given by the following equations.

$$y_k = f\left(b_k + \sum_j w_{kj} z_j\right) \tag{3}$$

$$f(y_k) = \frac{\exp(y_k)}{\sum_i \exp(y_i)} \tag{4}$$

In Equation (3), $z_j$ is the output value from the j-th neuron in the intermediate layer 1002, which is connected to the k-th neuron in the output layer 1003. Additionally, i and k are the numbers of neurons in the output layer 1003, where i and k=1 or 2. An output $y_k$ of each neuron in the output layer 1003 is normalized to add up to 1 by the SoftMax function shown in Equation (4). Assuming that $y_1$ and $y_2$ correspond to the classification of the main subject and the non-main subject, respectively, $f(y_1)$ and $f(y_2)$ represent the probability of being a main subject and the probability of being a non-main subject, respectively.

The input values for the neural network are the coordinates of the joints of the person and the coordinates and size of the ball. Then, all weights and biases are optimized through learning so as to minimize a loss function using the output probability and a correct answer label. The correct answer label is assumed to take two values, namely "1" for a main subject and "0" for a non-main subject. The loss function may be any function, such as the mean squared error, as long as the function can measure a degree to which the value matches the correct answer label. Here, as an example, binary cross entropy, indicated below, is assumed to be used for the loss function.

$$L(y, t) = -\sum_m t_m \log y_m - \sum_m (1 - t_m)\log(1 - y_m) \tag{5}$$

In Equation (5), m is the index of the subject that is to be trained. $y_m$ is equal to the probability value $f(y_1)$ output from the k=1 neurons in the output layer 1003. $t_m$ is the correct answer label (0 or 1).

By optimizing such that the value of Equation (5) is minimized, the weights and biases can be learned such that the correct answer label and the output probability value approach each other. The learned weights and biases can be stored in the recording medium 133, and stored in the RAM 136 and used by the CPU 121 as necessary. A plurality of types of learned weights and biases can be prepared according to the scene and the like.

The CPU 121 can obtain the probability $f(y_1)$ that the subject region is the region of the main subject by inputting the values obtained from the subject region into the neural network to which the learned weights and biases (the results of machine learning executed previously) have been applied.

Note that when training the neural network, the subject information (here, the joint positions) in the state immediately before transitioning to an important action can be used as the state of the main subject. For example, for sport in which a ball is thrown, the training can be performed using the joint positions detected from an image of a state in which a hand is extended forward to throw the ball as one of the states of the main subject.

The reason for performing such training is to enable the camera 100 to execute appropriate control for subjects exhibiting behavior that should be taken as the main subject. For example, automatically starting to record images when the probability value of the subject being the main subject exceeds a pre-set first predetermined value makes it possible to reliably record scenes that would not be recorded in time if the photographer manually makes shooting instructions. Note that the control may be performed using information on the typical time taken from the state used for training (a hand extended while holding the ball) to the important action (throwing the ball). This increases the likelihood of recording an image at the moment the important action is taken, such as the moment the ball leaves the hand.

An example of determining whether a subject is a main subject based on probability obtained using a trained neural network has been described here. However, other machine learning methods, such as support vector machines or decision trees, may be used as long as a similar determination can be made. Furthermore, the method is not limited to machine learning, and a function that outputs a reliability or probability value based on a given model may be constructed as well.

For example, for a sport that uses a ball, whether or not a person is the main subject may be determined based on the positional relationship between the person and the ball. For example, assuming that the smaller the distance between the person and the ball is, the higher the probability that the person is the main subject, it is possible to determine whether the person is the main subject according to the value of a monotonically-decreasing function for the distance between the person and the ball. Note also that whether a subject is the main subject may be determined using only the posture information of the subject, without using information on the ball.

Depending on the subject's action (e.g., passing, shooting, or the like), it may or may not be better to use the information on the ball. For example, in the case of a shooting action, the distance between the person and the ball will increase, but the photographer may wish to use the subject who shot the ball as the main subject. In this case, using only the posture information of the subject, without using the distance between the ball and the person, can result in a determination that better matches the photographer's intentions. On the other hand, if a person is about to receive the ball, using the distance between the ball and the person in addition to the posture information can result in a determination that better matches the photographer's intentions. In this manner, whether the information on the ball is to be taken into account may be determined depending on the type of action assumed from the posture information of the subject. In addition, data that has been subjected to a predetermined transformation, such as a linear transformation, for the coordinates of each joint or the coordinates and size of the ball, may be used as the input data for the neural network.

Alternatively, time series data of the posture information of the person, the positions of the person and the ball, the defocus amount for each subject, and the probability of being the main subject may be used as the input data for the neural network. The predicted coordinates of the joints of the person and the predicted coordinates and size of the ball at the time of capturing an image may be used as the input data for the neural network.

If the determination of the main subject frequently changes between subjects having a large difference in the defocus amounts, it is thought that this is often not the intent of the photographer. Accordingly, the CPU 121 can suppress such changes when it is determined, based on the time series data of the subject determined to be the main subject, that the main subject is frequently changing between subjects having a large difference in the defocus amounts. The CPU 121 can suppress such changes when the main subject determination changes between two subjects A and B (A to B, B to A), where the difference in the defocus amounts is greater than a threshold, two or more times during a period of a pre-set number of frames.

The CPU 121 can suppress such changes by, for example, correcting the reliability (probability) of being the main subject, obtained for one of the subjects A and B (e.g., the subject on the near side) to be higher. Alternatively, a region including both subjects A and B may be used as the region of the main subject. In this case, the CPU 121 can control the focal length and/or the aperture value such that both subjects are in focus.

Predictive data may be used when the amount of change per unit of time in the position of the subject or the joints is high (e.g., greater than a threshold), and not used when the amount of change is small (the same, or less than or equal to another threshold). Doing so makes it possible to maintain the accuracy of the reliability indicating the likelihood of being the main subject when the posture of the subject changes little, and detect the change in the main subject more quickly when the posture of the subject changes greatly.

As described thus far, the CPU 121 calculates the reliability (probability) of the subject being the main subject for the region of the subject of the first type. If a plurality of regions for subjects of the first type are detected, the reliability level is calculated for each region, and a representative value is taken as the reliability of the first type of subject. The representative value may be, for example, a maximum value.

In step S4002, the CPU 121 determines whether the reliability of the subject of the first type, calculated in step S4001, is at least the first predetermined value, executes step S4005 if the reliability is determined to be at least the first predetermined value, and executes step S4003 if not. As mentioned above, the reliability (probability) takes on a value between 0 and 100%, and thus the first predetermined value is also defined within this range. Here, the first predetermined value is assumed to be 80.

In step S4003, the CPU 121 determines whether the difference between the defocus amounts can be calculated in step S4000, executes step S4004 if it is determined that the difference can be calculated, and executes step S4007 if not. The difference between the defocus amounts cannot be calculated when the subject of the first type or the subject of the second type is out of the image capture range or only partially present in the image capture range due to, for example, subject movement, a change in the image capture range, or the like.

In step S4004, the CPU 121 determines whether the difference between the defocus amount of the subject of the first type, which is a person, and the defocus amount of the subject of the second type, which is a ball, is greater than a second predetermined value, executes step S4006 if the difference is determined to be greater than the second predetermined value, and executes step S4007 if not. The unit of the second predetermined value is the defocus amount, which can be 1Fδ, where F represents the aperture value and δ is the permissible circle of confusion diameter.

In step S4005, the CPU 121 determines the subject having the highest reliability (probability) of being the main subject, among the subjects of the first type, as the main subject.

In step S4006, the CPU 121 determines that the subject of the second type is the main subject. Although it is assumed here that one ball is detected, if a plurality of balls are detected, the CPU 121 determines the subject having the highest reliability (probability) of being the main subject to be the main subject.

Step S4006 is executed when the reliability (probability) that the subject of the first type is the main subject is less than the first predetermined value and the difference between the defocus amount of the subject of the first type and the defocus amount of the subject of the second type is greater than the second predetermined value. For example, in a sport in which a ball is passed, a state in which the ball is passed between people separated by a distance in the depth direction corresponds to this condition. By taking the subject of the second type (the ball) as the main subject, performing control to focus continuously on the ball makes it possible to change the focal length more smoothly than by immediately switching the main subject from the person making the pass to the person receiving the pass.

Similar to step S4005, in step S4007, the CPU 121 determines the subject having the highest reliability (probability) of being the main subject, among the subjects of the first type, as the main subject.

In step S4008, the CPU 121 determines that the subject of the first type or the subject of the second type is the main subject. Step S4008 is executed when the difference between the defocus amounts cannot be calculated. If only one type of subject is present, the CPU 121 determines the subject of the type present to be the main subject. However, if a plurality of subjects of one type are present, the subject having the highest reliability, a subject determined to be a main subject in the past, or the like may be determined to be the main subject. If only a part of a subject of one type is included, the subject closer to the center of the image may be determined to be the main subject, taking into account the framing by the photographer.

When the main subject is determined in any of steps S4005, S4006, S4007, and S4008, the CPU 121 ends the main subject determination processing.

Specific examples of the main subject determination processing will be given with reference to FIGS. 14A to 16B.

Figure 14A:
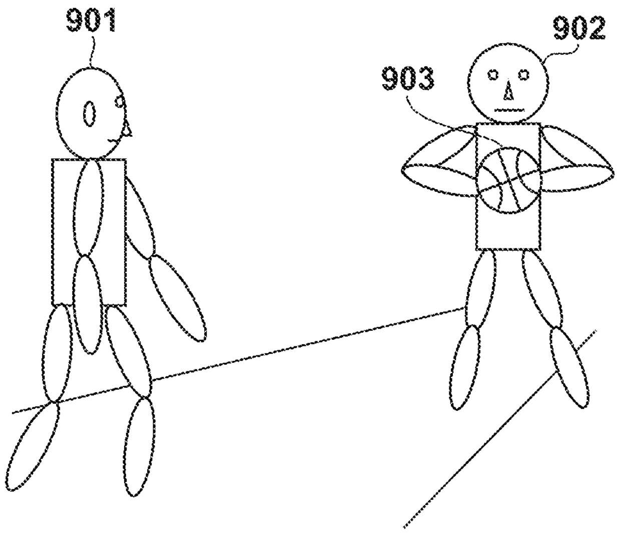
FIGS. 14A to 14C are diagrams illustrating a specific example of main subject determination processing according to an embodiment.
Figure 14B:
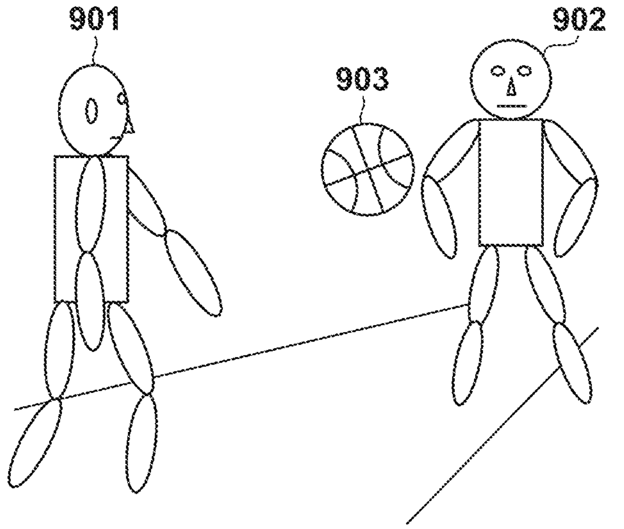
Figure 14C:
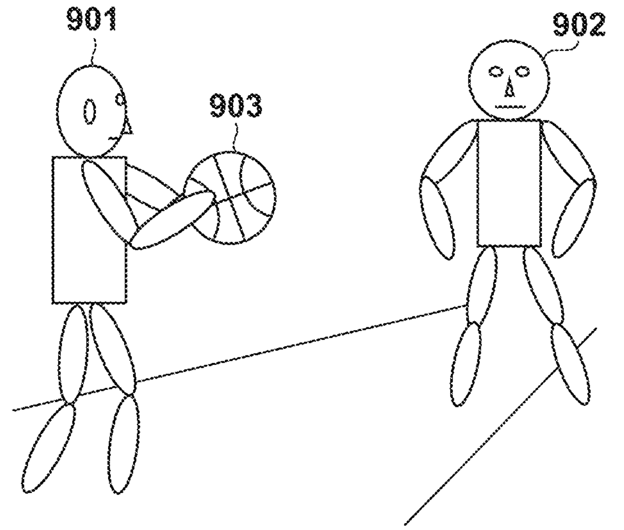

FIGS. 14A to 14C illustrate, in time series, a typical scene when the ball 903 is passed from the person 902 to the person 901, who are playing basketball. It is assumed that there is a sufficient difference between the defocus amounts (distances from the camera) of the people 901 and 902. Here, a “sufficient difference between the defocus amounts” may be a difference to the extent that one is in focus and the other is blurred.

FIG. 14A illustrates a state where the person 902 is performing a preparatory action to pass the ball 903. When the position and size of the joints of the person 902 and the position and size of the ball 903 are used to calculate the reliability of the person 902 being the main subject, the person 902 is in a posture of attempting to make a pass, and thus reliability higher than that of the person 901 and at least the first predetermined value is obtained. Accordingly, the flowchart illustrated in FIG. 12 moves from step S4002 to step S4005, and the person 902 is determined to be the main subject.

FIG. 14B illustrates a state where the ball 903 is separating from the person 902 and moving toward the person 901, and the person 901 is not yet taking action to receive the ball 903. Both people 901 and 902 are not in a posture for passing or receiving the ball 903. Accordingly, the reliability of being the main subject calculated for the people 901 and 902 is lower than the first predetermined value.

As the ball 903 moves from the person 902 to the person 901, the difference between the defocus amount of the person 902 determined to be the main subject in the state in FIG. 14A and the defocus amount of the ball 903 becomes greater than the second predetermined value. Accordingly, the flowchart illustrated in FIG. 12 proceeds to steps S4002, S4003, S4004, and S4006, and the subject of the second type, which is the ball 903, is determined to be the main subject.

FIG. 14C illustrates a state where the ball 903 is moving further and the person 901 is receiving the ball 903. When the position and size of the joints of the person 901 and the position and size of the ball 903 are used to calculate the reliability of the person 901 being the main subject, the person 901 is in a posture of receiving the ball 903, and thus reliability higher than that of the person 902 and at least the first predetermined value is obtained. Accordingly, the flowchart illustrated in FIG. 12 moves from step S4002 to step S4005, and the person 901 is determined to be the main subject.

Figure 15A:
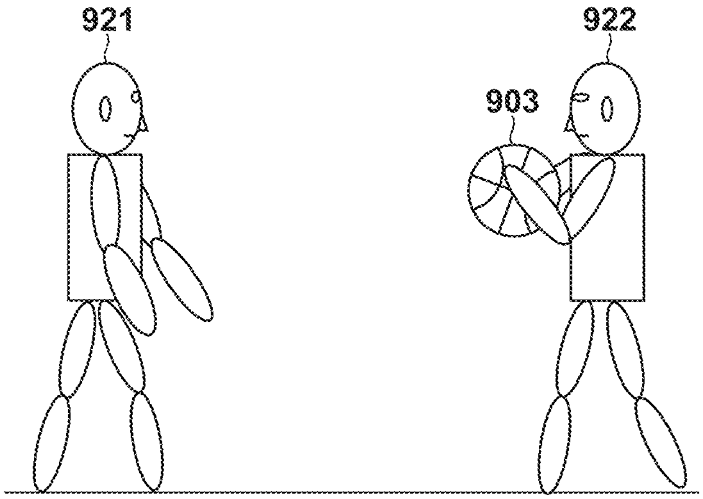
FIGS. 15A to 15C are diagrams illustrating a specific example of main subject determination processing according to an embodiment.
Figure 15B:
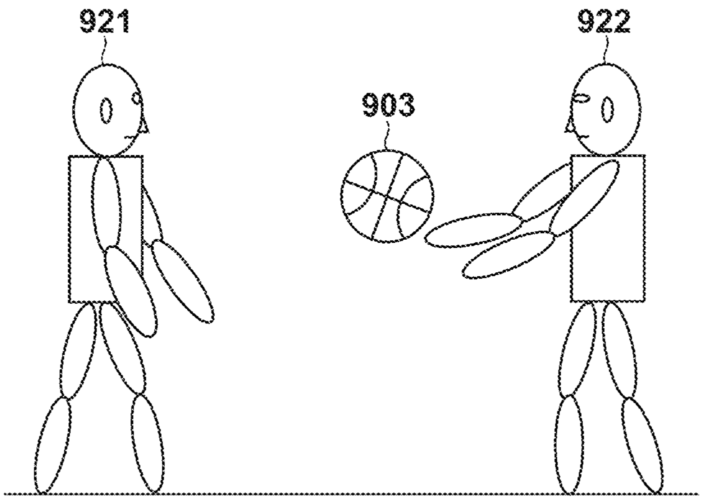
Figure 15C:
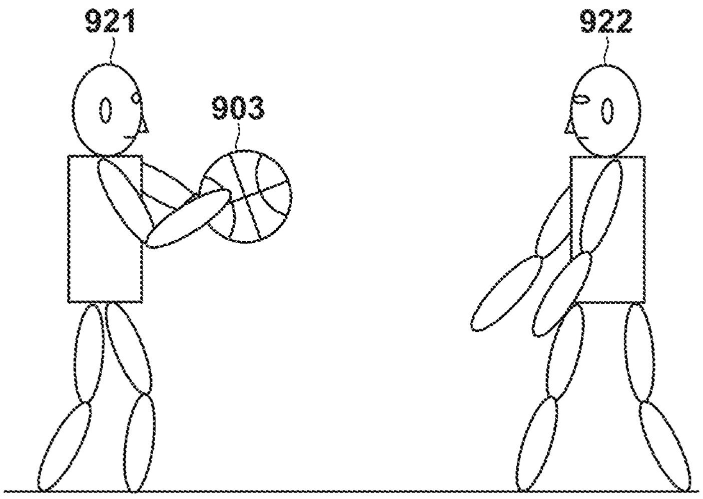

FIGS. 15A to 15C illustrate, in time series, a typical scene when a ball 923 is passed from a person 922 to a person 921, who are playing basketball. Note that unlike in FIGS. 14A to 14C, it is assumed that there is insufficient difference between the defocus amounts (distances from the camera) of the people 921 and 922.

FIG. 15A illustrates a state where the person 922 is performing a preparatory action to pass the ball 923. When the position and size of the joints of the person 922 and the position and size of the ball 923 are used to calculate the reliability of the person 922 being the main subject, the person 922 is in a posture of attempting to make a pass, and thus reliability higher than that of the person 921 and at least the first predetermined value is obtained. Accordingly, the flowchart illustrated in FIG. 12 moves from step S4002 to step S4005, and the person 922 is determined to be the main subject.

FIG. 15B illustrates a state where the ball 923 is separating from the person 922 and moving toward the person 921, and the person 921 is not yet taking action to receive the ball 923. Both people 921 and 922 are not in a posture for passing or receiving the ball 923. Accordingly, the reliability of being the main subject calculated for the people 921 and 922 is lower than the first predetermined value.

Because there is insufficient difference between the defocus amounts (distances from the camera) of the person 921 and the person 922, the difference between the defocus amount of the person 922, who is determined to be the main subject in state illustrated in FIG. 15A, and the defocus amount of the ball 923 is less than or equal to the second predetermined value. Accordingly, the flowchart illustrated in FIG. 12 proceeds to steps S4002, S4003, S4004, and S4007, and of the people 921 and 922, who are subjects of the first type, the subject having the higher reliability of being the main subject is determined to be the main subject.

FIG. 15C illustrates a state where the ball 923 is moving further and the person 921 is receiving the ball 923. When the position and size of the joints of the person 921 and the position and size of the ball 923 are used to calculate the reliability of the person 921 being the main subject, the person 921 is in a posture of receiving the ball 923, and thus reliability higher than that of the person 922 and at least the first predetermined value is obtained. Accordingly, the flowchart illustrated in FIG. 12 moves from step S4002 to step S4005, and the person 921 is determined to be the main subject.

Figure 16A:
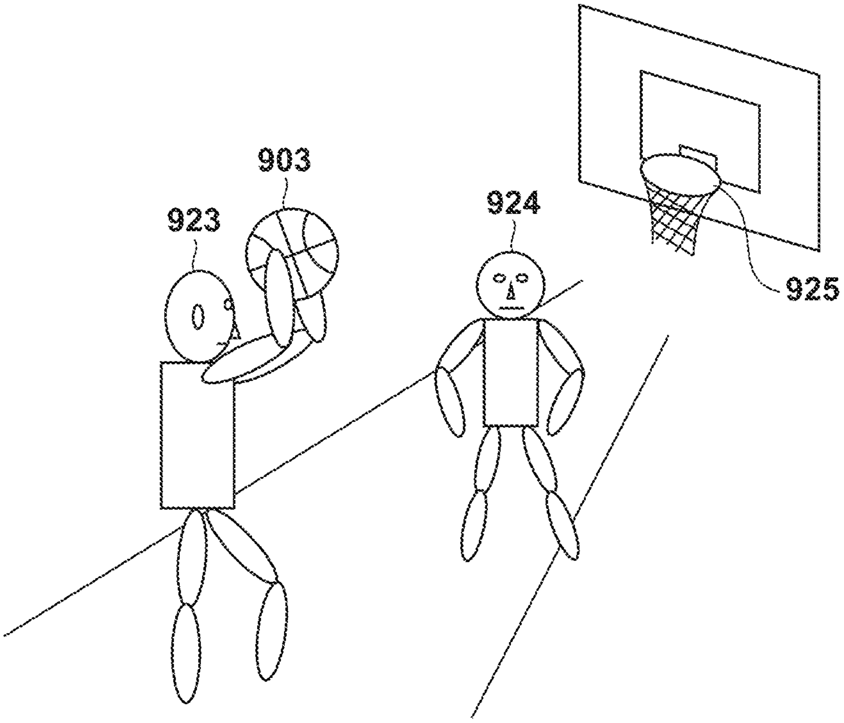
FIGS. 16A and 16B are diagrams illustrating a specific example of main subject determination processing according to an embodiment.
Figure 16B:
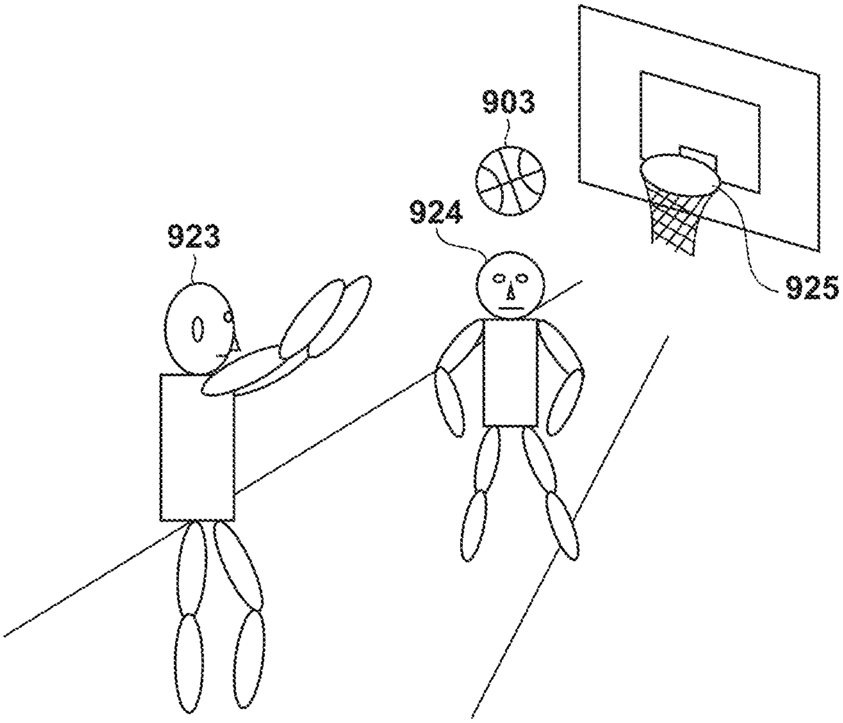

FIGS. 16A and 16B illustrate, in time series, a typical scene when a person 923, who is playing basketball, shoots the ball 903 into a basket 925 located behind a person 924. It is assumed that there is a sufficient difference between the defocus amounts (distances from the camera) of the people 924 and 923.

FIG. 16A illustrates a state where the person 923 is performing a preparatory action to shoot the ball 903. When the position and size of the joints of the person 923 and the position and size of the ball 903 are used to calculate the reliability of the person 923 being the main subject, the person 923 is in a posture of attempting to take a shot, and thus reliability higher than that of the person 924 and at least the first predetermined value is obtained. Accordingly, the flowchart illustrated in FIG. 12 moves from step S4002 to step S4005, and the person 923 is determined to be the main subject.

FIG. 16B illustrates a state where the ball 903 is separating from the person 923 and moving toward the basket 925, with the person 923 staying in the shooting posture. In this state, the reliability calculated for the person 923 drops below the first predetermined value due to the ball separating from the person 923. However, because the person 923 stays in the shooting posture, the reliability calculated for the person 923 becomes higher than the reliability calculated for the person 924. Accordingly, until the difference between the defocus amounts of the person 923 and the ball 903 becomes greater than the second predetermined value, the person 923 is determined to be the main subject in step S4007. Then, when the difference between the defocus amounts of the person 923 and the ball 903 becomes greater than the second predetermined value, the ball 903 is determined to be the main subject.

When the person 923 ends the shooting posture and the person 924 takes an action such as reaching out to take the ball 903, the reliability of the person 924 being the main subject will exceed that of the person 923. Accordingly, if the reliability of the person 924 being the main subject exceeds the first predetermined value, or the difference between the defocus amounts of the person 924 and the ball 903 becomes less than or equal to the second predetermined value despite the reliability not exceeding the first predetermined value, the person 924 is determined to be the main subject.

Consider a case where the person 923 has ended the shooting posture and the ball 903 is determined to be the main subject, and the person 924 does not take any action such as reaching out to take the ball 903. In this case, if the difference between the defocus amounts of the person 924 and the ball 903 becomes less than or equal to the second predetermined value, the main subject can change to the person 923 or 924, and then change again to the ball 903. Therefore, even if the difference between the defocus amounts of the person 924 and the ball 903 becomes less than or equal to the second predetermined value, the ball 903 may continue to be determined to be the main subject to suppress the changing of the main subject.

Figure 17:
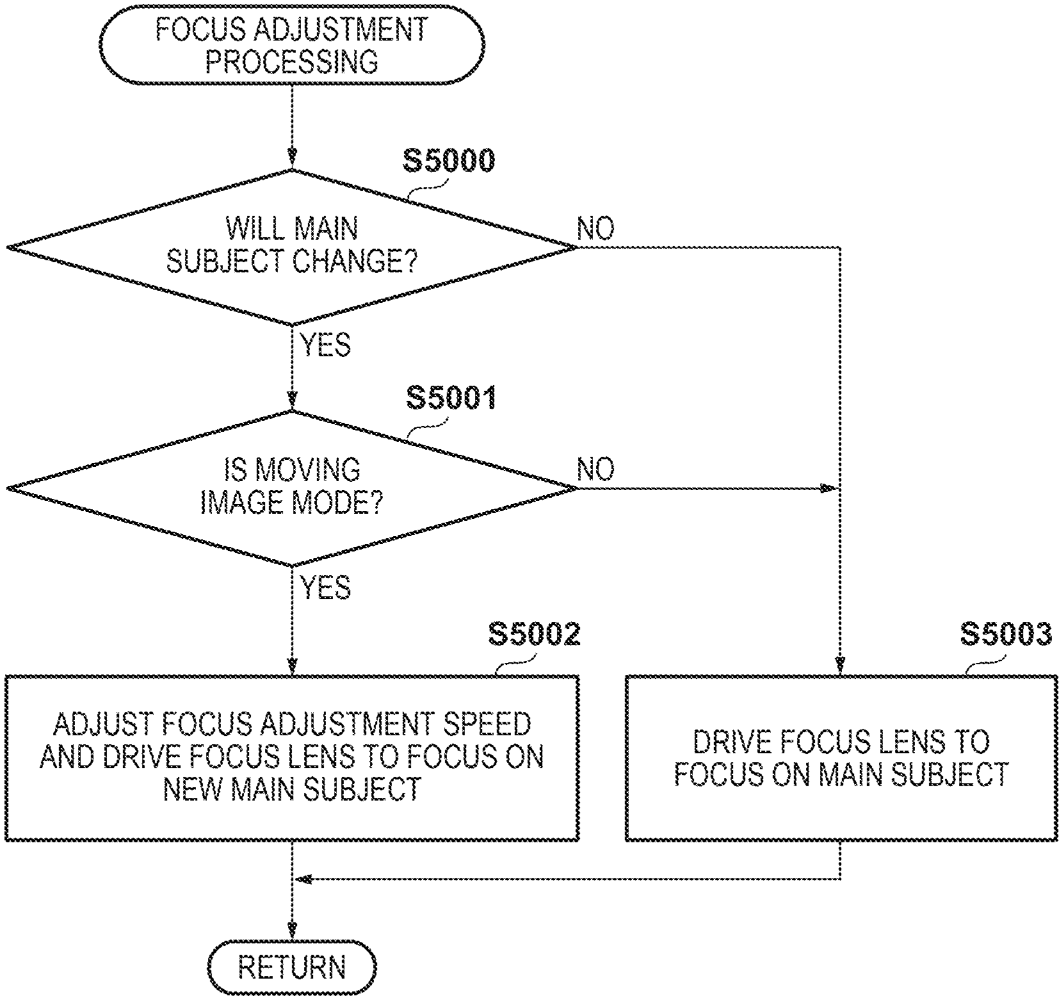
FIG. 17 is a flowchart pertaining to focus adjustment processing according to an embodiment.

Finally, the focus adjustment processing in step S308 of FIG. 9 will be described in detail with reference to the flowchart in FIG. 17.

In step S5000, the CPU 121 determines whether the main subject will change based on the result of the main subject determination processing in step S404, executes step S5001 if it is determined that the main subject will change, and executes step S5003 if not.

In step S5001, the CPU 121 determines whether the operating mode of the camera 100 is a moving image mode. "Moving image mode" is an operating mode in which a moving image for recording is captured and recorded, and is different from the state in which moving images are captured for live view display in a still image mode. The CPU 121 executes step S5002 if the operating mode is determined to be the moving image mode, and executes step S5003 if not.

In step S5002, the CPU 121 controls the driving of the focus lens 105 to focus on the new main subject. When operating in the moving image mode, because a moving image is also recorded while the focus lens is being driven, the CPU 121 adjusts the drive speed of the focus lens 105 so that the focal length does not exceed the new main subject.

For example, when the main subject changes from a person to a ball, when driving the focus lens 105 to focus at the distance of the ball, the focus lens 105 is driven at a speed that takes the deceleration capabilities into account such that the ball can be focused on without exceeding the distance of the ball. By doing so, abrupt changes in the focal length can be suppressed, and changing of the focal length with a high level of quality can be achieved.

The focus adjustment speed may be changed depending on whether or not the distance range is within a range in which the subject of the type to be detected is present. For example, consider a case where the main subject changes from a subject of the first type to a subject of the second type. In this case, the drive speed of the focus lens 105 in the distance range where a subject of the first type is present is slower than the drive speed of the focus lens 105 in the distance range where neither a subject of the first type nor a subject of the second type is present. Alternatively, the drive speed of the focus lens 105 in the distance range where neither a subject of the first type nor a subject of the second type is present is set to be faster than the drive speed of the focus lens 105 in the distance range where a subject of the first type is present.

In the distance range where neither a subject of the first type nor a subject of the second type is present, driving the focus lens 105 faster will have little effect on the quality of the moving image. As such, reducing the time required to switch the in-focus subject is prioritized. In this case, the focus lens is also driven such that the focal length does not exceed the distance of the subject of the second type.

Note that such adjustment of the drive speed of the focus lens 105 may be performed even in an operating mode aside from the moving image mode.

In step S5003, the CPU 121 drives the focus lens 105 to focus on the current main subject or the new main subject. Because the camera is not operating in the moving image mode, no moving image is recorded while the focus lens 105 is being driven. Accordingly, the CPU 121 drives the focus lens 105 as fast as possible to the extent that the new main subject can be focused on without exceeding the distance of the new main subject.

When the control for focusing on the new main subject ends in step S5002 or step S5003, the CPU 121 ends the focus adjustment processing.

The image processing apparatus according to the present embodiment obtains, for each of the detected subject(s) of the first type, reliability that the subject is a main subject, based on the posture. Then, based on the focus conditions (defocus amounts) of the subject(s) of the first type and the subject(s) of the second type detected from the image, and the reliability of the subject(s) of the first type, the image processing apparatus determines the main subject from the subject(s) of the first type and the subject(s) of the second type. This makes it possible to change the main subject to the subject of the second type before the main subject changes among subjects of the first type which have different defocus amounts. As a result, deterioration of the quality of a moving image caused by changes in the main subject can be suppressed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-211449, filed on Dec. 24, 2021, which is hereby incorporated by reference herein in its entirety.

What is claimed is:

1. A focus adjustment processing apparatus comprising:

one or more processors which, when executing a program stored in a memory, function as:

a first detection unit configured to detect, from an image, a subject(s) of a first type and a subject(s) of a second type that is a different type from the subject(s) of the first type;

a focus condition obtainment unit configured to obtain a focus condition for each of the subject(s) of the first type and each of the subject(s) of the second type detected by the first detection unit; and a focus adjustment unit configured to, after a subject of the first type is focused, based on (i) a distance in depth direction between the subject of the first type and a subject(s) of the second type or (ii) a difference of focus conditions between the subject of the first type and a subject(s) of the second type, switch a subject to be focused from the subject of the first type to a subject of the second type.

2. The focus adjustment processing apparatus according to claim 1, wherein the one or more processors further function as:

a second detection unit configured to detect a posture for each of the subject(s) of the first type detected by the first detection unit; and a reliability obtainment unit configured to obtain, for each of the subject(s) of the first type detected by the first detection unit, reliability that the subject is a main subject, based on the posture, wherein the focus adjustment unit causes, among the subject(s) of the first type detected by the first detection unit, a subject of the first type for which the reliability is at least a pre-set first predetermined value to be focused.

3. The focus adjustment processing apparatus according to claim 2, wherein the focus adjustment unit determines a subject to be focused from the subject(s) of the first type based on the reliability, in a case where (i) a distance in depth direction between the subject(s) of the first type and the subject(s) of the second type or (ii) a difference of focus conditions between the subject(s) of the first type and the subject(s) of the second type is not greater than a pre-set second predetermined value.

4. The focus adjustment processing apparatus according to claim 2, wherein if, among the detected subject(s) of the first type, there is no subject for which the reliability is at least the pre-set first predetermined value, the focus adjustment unit determines a subject to be focused from the subject(s) of the first type and the subject(s) of the second type detected by the first detection unit based on a difference between the focus condition of the subjects(s) of the first type and the focus condition of the subject(s) of the second type.

5. The focus adjustment processing apparatus according to claim 2, wherein the reliability obtainment unit obtains the reliability using information on the subject(s) of the second type, in addition to the posture.

6. The focus adjustment processing apparatus according to claim 2, wherein the reliability obtainment unit obtains the reliability using positional relationship(s) between the subject(s) of the first type and the subject(s) of the second type, in addition to the posture.

7. The focus adjustment processing apparatus according to claim 2, wherein the subject(s) of the first type is a person, and the second detection unit detects the posture based on information on a joint(s).

8. The focus adjustment processing apparatus according to claim 7, wherein the posture is a posture for taking an action related to the subject(s) of the second type.

9. The focus adjustment processing apparatus according to claim 7, wherein the posture is a posture for taking an action related to the ball(s).

10. The focus adjustment processing apparatus according to claim 1, wherein the focus adjustment unit, after a subject of the first type is focused, switches a subject to be focused from the subject of the first type to a subject of the second type in a case where (i) a distance in depth direction between the subject of the first type and a subject(s) of the second type or (ii) a difference of focus conditions between the subject of the first type and a subject(s) of the second type is greater than a pre-set second predetermined value.

11. The focus adjustment processing apparatus according to claim 1, further comprising:

a second detection unit configured to detect a posture for each of the subject(s) of the first type detected by the first detection unit;

a reliability obtainment unit configured to obtain, for each of the subject(s) of the first type detected by the first detection unit, reliability that the subject is a main subject, based on the posture, wherein the focus adjustment unit switches a subject to be focused from the subject of the first type to a subject of the second type further based on the reliability.

12. The focus adjustment processing apparatus according to claim 1, wherein if the difference between the focus conditions cannot be obtained, the focus adjustment unit causes a subject close to a center of the image, among the subject(s) of the first type and the subject(s) of the second type to be focused.

13. The focus adjustment processing apparatus according to claim 1, wherein the subject(s) of the second type is an object that moves between the subject(s) of the first type.

14. A focus adjustment processing apparatus comprising:

one or more processors which, when executing a program stored in a memory, function as:

a first detection unit configured to detect, from an image, a person(s) and a ball(s);

a focus condition obtainment unit configured to obtain a focus condition for each of the person(s) and each of the ball(s) detected by the first detection unit; and a focus adjustment unit configured to, after a person is focused, based on (i) a distance in depth direction between the person and a ball(s) or (ii) a difference of focus conditions between the person and a ball(s), switch a subject to be focused from the person to a ball.

15. The focus adjustment processing apparatus according to claim 14, wherein the one or more processors further function as:

a second detection unit configured to detect a posture for each of the person(s) detected by the first detection unit; and a reliability obtainment unit configured to obtain, for each of the person(s) detected by the first detection unit, reliability that the person is a main subject, based on the posture, wherein the focus adjustment unit causes, among the person(s), a person for which the reliability is at least a pre-set first predetermined value to be focused.

16. The focus adjustment processing apparatus according to claim 15, wherein the focus adjustment unit determines a subject to be focused from the person(s) based on the reliability, in a case where (i) a distance in depth direction between the person(s) and the ball(s) or (ii) a difference of focus conditions between the person(s) and the ball(s) is not greater than a pre-set second predetermined value.

17. The focus adjustment processing apparatus according to claim 15, wherein if, among the detected person(s), there is no person for which the reliability is at least the pre-set first predetermined value, the focus adjustment unit determines a subject to be focused from the person(s) and the ball(s) detected by the first detection unit based on a difference between the focus condition of the person(s) and the focus condition of the ball(s).

18. The focus adjustment processing apparatus according to claim 15, wherein the reliability obtainment unit obtains the reliability using information on the ball(s), in addition to the posture.

19. The focus adjustment processing apparatus according to claim 15, wherein the reliability obtainment unit obtains the reliability using positional relationship(s) between the person(s) and the ball(s), in addition to the posture.

20. The focus adjustment processing apparatus according to claim 15, wherein the second detection unit detects the posture based on information on a joint(s).

21. The focus adjustment processing apparatus according to claim 14, wherein the focus adjustment unit, after a person is focused, causes a ball(s) to be focused in a case where (i) a distance in depth direction between the person and ball(s) or (ii) a difference of focus conditions between the person and a ball(s) is greater than a pre-set second predetermined value.

22. The focus adjustment processing apparatus according to claim 14, wherein the one or more processors further function as:

a second detection unit configured to detect a posture for each of the person(s) detected by the first detection unit; and a reliability obtainment unit configured to obtain, for each of the person(s) detected by the first detection unit, reliability that the person is a main subject, based on the posture, wherein the focus adjustment unit, after a person is focused, switches a subject to be focused from the person to a ball further based on the reliability.

23. The focus adjustment processing apparatus according to claim 14, wherein if the difference between the focus conditions cannot be obtained, the focus adjustment unit causes a subject close to a center of the image, among the person(s) and the ball(s) to be focused.

24. An image capture apparatus comprising:

an image sensor that captures an image;

a focus adjustment processing apparatus, wherein the focus adjustment processing apparatus comprises:

one or more processors which, when executing a program stored in a memory, function as:

a first detection unit configured to detect, from an image, a subject(s) of a first type and a subject(s) of a second type that is a different type from the subject(s) of the first type;

a focus condition obtainment unit configured to obtain a focus condition for each of the subject(s) of the first type and each of the subject(s) of the second type detected by the first detection unit; and a focus adjustment unit configured to, after a subject of the first type is focused, based on (i) a distance in depth direction between the subject of the first type and a subject(s) of the second type or (ii) a difference of focus conditions between the subject of the first type and a subject(s) of the second type, switch a subject to be focused from the subject of the first type to a subject of the second type.

25. An image capture apparatus comprising:

an image sensor that captures an image;

a focus adjustment processing apparatus, wherein the focus adjustment processing apparatus comprises:

one or more processors which, when executing a program stored in a memory, function as:

a first detection unit configured to detect, from an image, a person(s) and a ball(s);

a focus condition obtainment unit configured to obtain a focus condition for each of the person(s) and each of the ball(s) detected by the first detection unit; and a focus adjustment unit configured to, after a person is focused, based on (i) a distance in depth direction between the person and a ball(s) or (ii) a difference of focus conditions between the person and a ball(s), switch a subject to be focused from the person to a ball.

26. A focus adjustment processing method comprising:

detecting, from an image, a subject(s) of a first type and a subject(s) of a second type that is a different type from the subject(s) of the first type;

obtaining a focus condition for each of the detected subject(s) of the first type and each of the detected subject(s) of the second type; and after a subject of the first type is focused, based on (i) a distance in depth direction between the subject of the first type and a subject(s) of the second type or (ii) a difference of focus conditions between the subject of the first type and a subject(s) of the second type, switching a subject to be focused from the subject of the first type to a subject of the second type.

27. A focus adjustment processing method comprising:

detecting, from an image, a person(s) and a ball(s);

obtaining a focus condition for each of the person(s) and each of the ball(s) detected in the detecting; and after a person is focused, based on (i) a distance in depth direction between the person and a ball(s) or (ii) a difference of focus conditions between the person and a ball(s), switching a subject to be focused from the person to a ball.

28. A non-transitory computer-readable medium storing a program for causing a computer to function as a focus adjustment processing apparatus comprising:

a first detection unit configured to detect, from an image, a subject(s) of a first type and a subject(s) of a second type that is a different type from the subject(s) of the first type;

a focus condition obtainment unit configured to obtain a focus condition for each of the subject(s) of the first type and each of the subject(s) of the second type detected by the first detection unit; and a focus adjustment unit configured to, after a subject of the first type is focused, based on (i) a distance in depth direction between the subject of the first type and a subject(s) of the second type or (ii) a difference of focus conditions between the subject of the first type and a subject(s) of the second type, switch a subject to be focused from the subject of the first type to a subject of the second type.

29. A non-transitory computer-readable medium storing a program for causing a computer to function as a focus adjustment processing apparatus comprising:

a first detection unit configured to detect, from an image, a person(s) and a ball(s);

a focus condition obtainment unit configured to obtain a focus condition for each of the person(s) and each of the ball(s) detected by the first detection unit; and a focus adjustment unit configured to, after a person is focused, based on (i) a distance in depth direction between the person and a ball(s) or (ii) a difference of focus conditions between the person and a ball(s), switch a subject to be focused from the person to a ball.

* * * * *